United States Patent
Shinya et al.

(10) Patent No.: US 8,553,809 B2
(45) Date of Patent: Oct. 8, 2013

(54) RECEPTION APPARATUS, RECEPTION METHOD, PROGRAM, AND RECEPTION SYSTEM

(75) Inventors: Osamu Shinya, Kanagawa (JP); Takashi Horiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 353 days.

(21) Appl. No.: 12/953,862

(22) Filed: Nov. 24, 2010

(65) Prior Publication Data

US 2011/0158355 A1 Jun. 30, 2011

(30) Foreign Application Priority Data

Dec. 25, 2009 (JP) ................................ 2009-294546

(51) Int. Cl.
*H04L 27/06* (2006.01)
(52) U.S. Cl.
USPC ........... 375/340; 375/316; 375/259; 375/260; 375/295; 375/267; 375/347
(58) Field of Classification Search
USPC ................. 375/340, 316, 259, 260, 295, 267, 375/347
See application file for complete search history.

(56) References Cited

U.S. PATENT DOCUMENTS

| | | | | |
|---|---|---|---|---|
| 2009/0201990 A1* | 8/2009 | Leprovost et al. | ........ | 375/240.12 |
| 2009/0303958 A1* | 12/2009 | Vesma et al. | .................. | 370/330 |
| 2010/0086087 A1* | 4/2010 | Pekonen et al. | .............. | 375/346 |
| 2011/0013718 A1* | 1/2011 | Ko et al. | ........................ | 375/295 |
| 2011/0103300 A1* | 5/2011 | Vare et al. | ...................... | 370/328 |
| 2011/0188588 A1* | 8/2011 | Ko et al. | ........................ | 375/260 |
| 2011/0200128 A1* | 8/2011 | Ko et al. | ........................ | 375/260 |
| 2011/0264982 A1* | 10/2011 | Zhou et al. | .................... | 714/755 |
| 2011/0274211 A1* | 11/2011 | Ko et al. | ........................ | 375/300 |
| 2011/0280327 A1* | 11/2011 | Ko et al. | ........................ | 375/260 |

OTHER PUBLICATIONS

"Digital Video Broadcasting (DVB); Frame structure channel coding and modulation for a second generation digital terrestrial television broadcasting system(DVB-T2)", Jun. 2010, 179 pages.

\* cited by examiner

*Primary Examiner* — Kenneth Lam
(74) *Attorney, Agent, or Firm* — Oblon, Spivak, McClelland, Maier & Neustadt, L.L.P.

(57) ABSTRACT

A reception apparatus is disclosed which includes: a reception section configured to receive an orthogonal frequency division multiplexing signal known as an OFDM signal formed by modulating common packet sequences and data packet sequences, the common packet sequences being made up of packets common to a plurality of streams, the data packet sequences being constituted by packets unique to each of the plurality of streams; an acquisition section configured to acquire decoding information for decoding the original streams from the common packet sequences and the data packet sequences obtained by demodulating the received OFDM signal; and a search section configured to search for the common packet sequence needed to decode the original streams from the designated data packet sequence on the basis of the acquired decoding information.

16 Claims, 22 Drawing Sheets

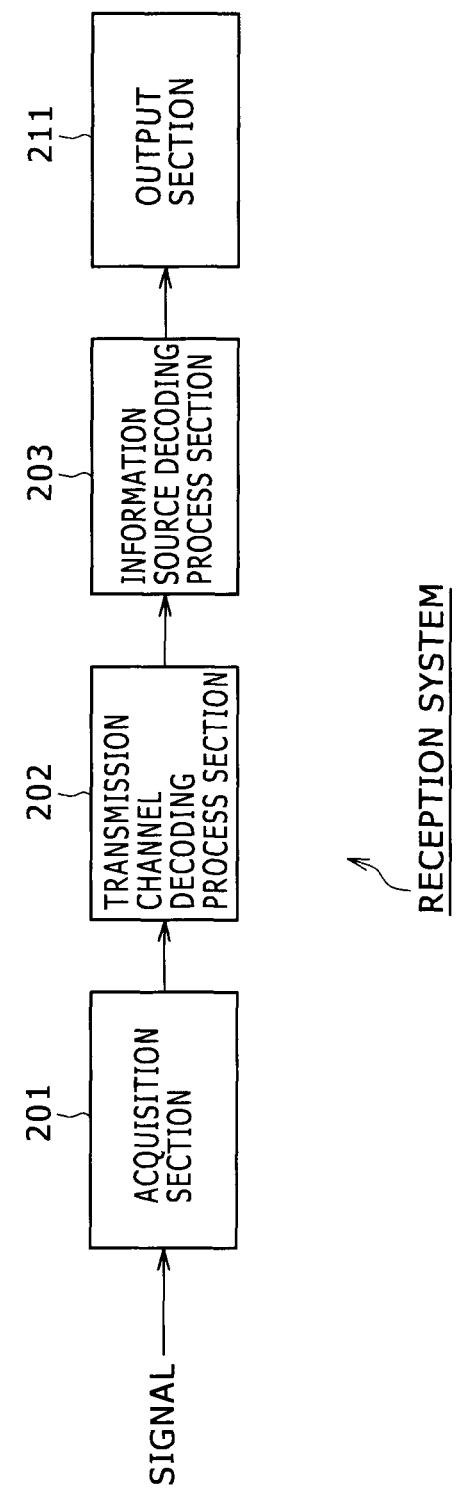

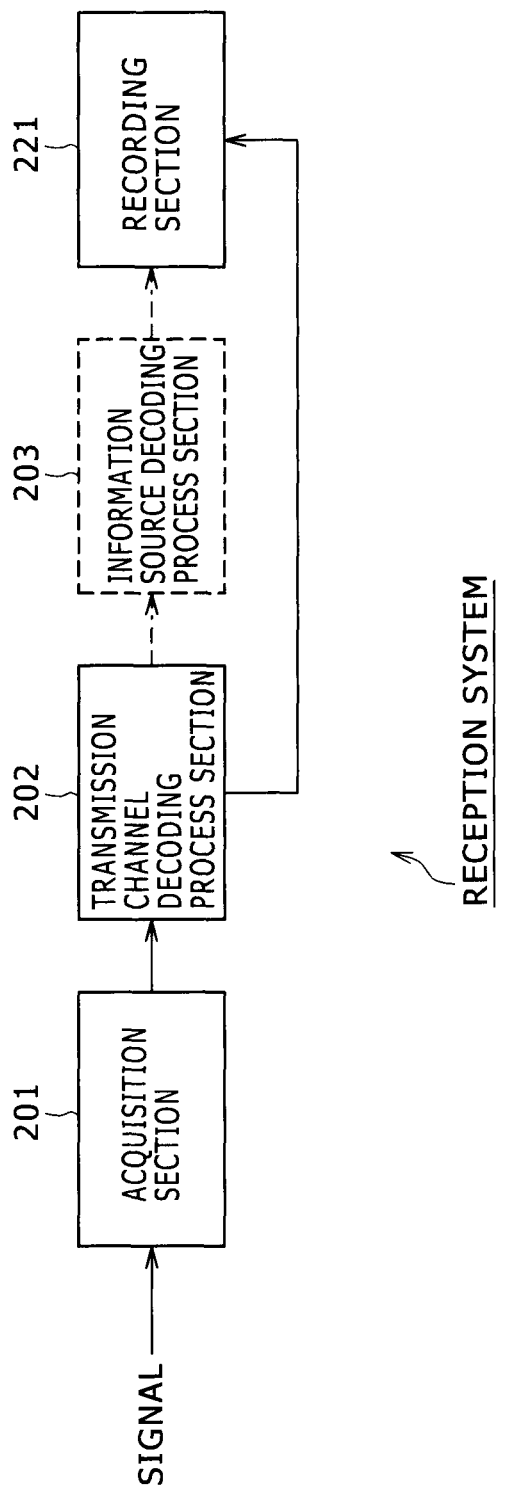

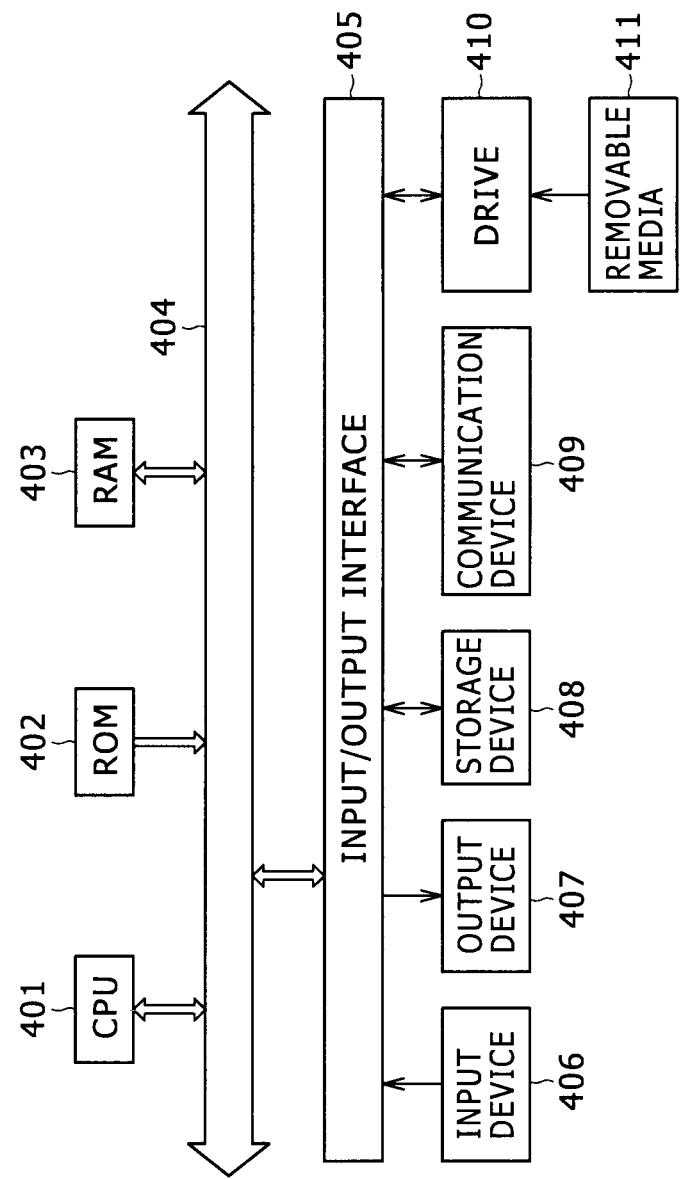

RECEPTION APPARATUS, RECEPTION METHOD, PROGRAM, AND RECEPTION SYSTEM

BACKGROUND OF THE INVENTION

1. Field of the Invention

The present invention relates to a reception apparatus, a reception method, a program, and a reception system. More particularly, the invention relates to a reception apparatus, a reception method, a program, and a reception system for performing decoding processes faster than before.

2. Description of the Related Art

Recent years have witnessed widespread use of the modulation method called OFDM (Orthogonal Frequency Division Multiplexing) for transmitting digital signals. The OFDM method involves preparing numerous orthogonally oriented subcarriers within a transmission band in such a manner that data is allotted to the amplitude and phase of each of the subcarriers subject to digital modulation through PSK (Phase Shift Keying) or QAM (Quadrature Amplitude Modulation).

The OFDM method is often applied to terrestrial digital broadcasts that are highly vulnerable to multi-pass interference. The terrestrial digital broadcasts adopting the OFDM method typically comply with such standards as DVB-T (Digital Video Broadcasting-Terrestrial) and ISDB-T (Integrated Services Digital Broadcasting-Terrestrial).

Meanwhile, DVB-T2 (Digital Video Broadcasting-Terrestrial 2; second generation digital terrestrial television broadcasting system) is being worked out as a standard for the digital terrestrial broadcasts that utilize the OFDM method. DVB-T2 is described illustratively in the so-called Bluebook (DVB Bluebook A122, "Frame structure channel coding and modulation for a second generation digital terrestrial television broadcasting system (DVB-T2)," DVB Document A122 June 2008, called the Non-patent Document 1 hereunder).

Under DVB-T2 (i.e., as stipulated in the Bluebook), frames each called a T2 frame are defined. Data is transmitted in units of a T2 frame. The T2 frame has two preamble signals called P1 and P2. These preamble signals include information necessary for processing the OFDM signal illustratively such as through decoding.

FIG. 1 is a schematic view showing the format of the T2 frame. The T2 format includes a P1 symbol, a P2 symbol, and data symbols, in that order. The P1 symbol is a symbol for transmitting P1 signaling that includes a transmission type and basic transmission parameters.

More specifically, the P1 signaling includes parameters S1 and S2. The parameters S1 and S2 indicate a P2 transmission type (i.e., whether P2 is transmitted in SISO (Single Input Single Output) fashion (using one transmitting antenna and one receiving antenna) or in MISO (Multiple Input Single Output) fashion (using multiple transmitting antennas but one receiving antenna)), and an FFT size for performing FFT computation of P2 (i.e., number of samples (symbols) subject to one FFT computation). It follows that to demodulate the P2 symbol requires demodulating the P1 symbol first.

The P2 symbol is a symbol for transmitting L1 pre-signaling and L1 post-signaling. The L1 pre-signaling includes information used by a reception apparatus receiving T2 frames for receiving and decoding the L1 post-signaling. The L1 post-signaling includes parameters needed by the reception apparatus for accessing the physical layer (i.e., its layer pipes).

DVB-T2 adopts a method called M-PLP (Multiple PLP (Physical Layer Pipe)). According to the M-PLP method, data is transmitted using packet sequences (data packet sequences) constituted by a plurality of Data PLP's composed of the packets left behind after extracting from a plurality of original transport streams (TS's) those packets (information) common to all TS's, and packet sequences (common packet sequences) called Common PLP's constituted by the packets common to the TS's. In other words, a Common PLP is composed of packets common to a plurality of TS's, and a Data PLP is constituted by packets unique to each of a plurality of TS's. On the receiving side, a single original TS is restored from a Common PLP and Data PLP's.

A Data PLP is a unit of service information, and a Common PLP is a portion common to at least two Data PLP's. Thus there exists the following relationship:

Data PLP count≥2×Common PLP count≥0

It follows that a plurality of Data PLP's are combined with a single Common PLP. At least two Data PLP's exist with regard to a given Common PLP, and there is one Common PLP for a given Data PLP.

To decode one unit of service information requires decoding two PLP's (a Common PLP and a Data PLP) simultaneously. The decoding information necessary for decoding the Common PLP and Data PLP (the information is called PLP information hereunder) is included in the L1 post-signaling. Thus when a decoding process is to be carried out, the PLP information made up of a Common PLP and Data PLP's corresponding to the service information desired to be decoded needs to be extracted from the L1 post-signaling.

As shown in FIG. 1, a plurality of units of PLP information are arranged in order of their PLPID's within the L1 post-signaling. Each unit of PLP information contains a PLPID for uniquely identifying each PLP, a PLP type for indicating whether this PLP is a Data PLP or a Common PLP, a GroupID for uniquely identifying the corresponding Common PLP and Data PLP, and PLP transmission parameter information.

Through these units of PLP information, a search is made for the PLP information composed of a Common PLP and Data PLP's corresponding to the target service information (this process is called the PLP search process). In FIG. 1, a search is made for Data PLP's for PLPID=2 and a Common PLP for PLPID=3 under the same GroupID=1. Then selection is made of the Data PLP's and Common PLP within the data symbols corresponding to the selected Data PLP's (PLPID=2) and appended (i.e., relevant) Common PLP (PLPID=3), so that the PLP's applicable to the target service information are decoded.

The PLP search process above is explained below in more detail by reference to FIGS. 2 through 4. As shown in FIG. 2, suppose that PLPID=4 is designated by a user's operation as the ID for the target service information (PLPID). In this case, a search is made starting from the first PLPID=0, until a Data PLP is found in a fifth PLPID=4 coinciding with the designated PLPID. Because GroupID=2 is allotted to the Data PLP's of PLPID=4, another search is made for a Common PLP which follows PLPID=4 and to which GroupID=2 is allotted. Then a Common PLP for a sixth PLPID=5 from the beginning is found, whereby the PLP information applicable to PLPID=5 is identified.

In another example in FIG. 3 where the Common PLP to which GroupID=2 is allotted is not PLPID=5 but PLPID=3, a search is made until the last PLP (PLPID=8) of the current T2 frame (i.e., its L1 post-signaling) is reached but no Common PLP of GroupID=2 is identified. In this case, the next T2 frame (its L1 post-signaling) is awaited, and a search is again made for a Common PLP to which GroupID=2 is allotted from among the Common PLP's ranging from the first PLP (PLPID=0) to the designated PLPID=4. In FIG. 3, GroupID=2 is found allotted to the Common PLP of PLPID=3, so that the PLP information applicable to PLPID=3 is identified.

In yet another example shown in FIG. 4, there is no Common PLP to which GroupID=2 applicable to the designated PLPID=4 corresponds. In this case, a search is made from PLPID=5 up to the last PLP of the current T2 frame (PLPID=8) and another search is made from the first PLP of the next T2 frame (PLPID=2) up to the designated PLPID=4, and yet no Common PLP of GroupID=2 is identified. This is a case where no Common PLP is defined.

As described, whereas the PLP search process is completed within one T2 frame in the case of FIG. 2, the process does not end within one T2 frame in the cases of FIGS. 3 and 4. Since the PLP search process needs to be continued into the next T2 frame, it takes longer to make the search in the cases of FIGS. 3 and 4 than in the case of FIG. 2.

SUMMARY OF THE INVENTION

As explained above, if units of PLP information are arranged in the order shown in FIG. 3 or 4 inside the L1 post-signaling of a given T2 frame, the PLP search process needs to be performed not only over the current T2 frame but also into the next T2 frame. Thus decoding takes time.

The present invention has been made in view of the above circumstances and provides among others a reception apparatus that performs PLP search processes rapidly for fast decoding when receiving signals transmitted in such a manner that a plurality of methods are multiplexed therein.

In carrying out the present invention and according to one embodiment thereof, there is provided a reception apparatus including: reception means for receiving an orthogonal frequency division multiplexing signal known as an OFDM signal formed by modulating common packet sequences and data packet sequences, the common packet sequences being made up of packets common to a plurality of streams, the data packet sequences being constituted by packets unique to each of the plurality of streams; acquisition means for acquiring decoding information for decoding the original streams from the common packet sequences and the data packet sequences obtained by demodulating the received OFDM signal; and search means for searching for the common packet sequence needed to decode the original streams from the designated data packet sequence on the basis of the acquired decoding information.

Preferably, the reception apparatus may further include storage means for storing the decoding information about the acquired common packet sequence until the decoding information about the designated data packet sequence is acquired; wherein, when the decoding information about the designated data packet sequence is acquired, the search means may search the stored decoding information about the common packet sequences for the decoding information identified by the decoding information about the acquired data packet sequences.

Preferably, if the decoding information cannot be identified from the stored decoding information about the common packet sequences, then the search means may search for the decoding information identified by the decoding information about the acquired data packet sequences out of that decoding information about the common packet sequences which is acquired following the acquisition of the decoding information about the designated data packet sequence.

Preferably, the storage means may be made up of as many as n registers, the number n satisfying a relationship of n=m where m represents a maximum number of units of the decoding information about the common packet sequences; and if the decoding information about the common packet sequences cannot be identified from within a first frame targeted for the search, then the search means may determine that the common packet sequences do not exist.

Preferably, there may exist a predetermined number of units of the decoding information about the common packet sequences which are identified by the decoding information about the designated data packet sequence; and the search means may search for the predetermined number of units of the decoding information about the common packet sequences which are identified by the decoding information about the designated data packet sequence.

Preferably, the storage means may be made up of as many as n registers, the number n satisfying a relationship of $1 \leq n \leq m$ where m represents a maximum number of units of the decoding information about the common packet sequences; and if the decoding information about the common packet sequences cannot be identified from within a first frame targeted for the search, then the search means may search through a second frame next to the first frame.

Preferably, there may exist a predetermined number x of units of the decoding information about the common packet sequences which are identified by the decoding information about the designated data packet sequence, the number x satisfying a relationship of $1 \leq x \leq n \leq m$; and the search means may search for the predetermined number of units of the decoding information about the common packet sequences which are identified by the decoding information about the designated data packet sequence.

Preferably, there may exist an indefinite number of units of the decoding information about the common packet sequences which are identified by the decoding information about the designated data packet sequence; and the search means may search for the indefinite number of units of the decoding information about the common packet sequences which are identified by the decoding information about the designated data packet sequence.

Preferably, the decoding information may include at least a first and a second identifier, the first identifier identifying each packet sequence, the second identifier distinguishing the corresponding common packet sequence from the data packet sequences; and the search means may identify the decoding information about the data packet sequence having the designated first identifier, before identifying the decoding information about the common packet sequence having the second identifier included in the decoding information about the designated data packet sequence.

Preferably, the reception apparatus may further include decoding means for decoding the original streams from the common packet sequences and the data packet sequences based on a result of the search made by the search means.

Preferably, the common packet sequences and the data packet sequences may be constituted, respectively, by Common PLP's which stand for common physical pipe layers and by Data PLP's which stand for data physical pipe layers generated from a plurality of original streams according to an M-PLP method which stands for a multiple physical layer pipe method under DVB-T2.

According to another embodiment of the present invention, there is provided a reception method for causing a reception apparatus to execute a procedure including the steps of: receiving an orthogonal frequency division multiplexing signal known as an OFDM signal formed by modulating common packet sequences and data packet sequences, the common packet sequences being made up of packets common to a plurality of streams, the data packet sequences being constituted by packets unique to each of the plurality of streams; acquiring decoding information for decoding the original streams from the common packet sequences and the data packet sequences obtained by demodulating the received OFDM signal; and searching for the common packet sequence needed to decode the original streams from the designated data packet sequence on the basis of the acquired decoding information.

According to a further embodiment of the present invention, there is provided a program for causing a computer to implement the functions including: reception means for receiving an orthogonal frequency division multiplexing signal known as an OFDM signal formed by modulating common packet sequences and data packet sequences, the common packet sequences being made up of packets common to a plurality of streams, the data packet sequences being constituted by packets unique to each of the plurality of streams; acquisition means for acquiring decoding information for decoding the original streams from the common packet sequences and the data packet sequences obtained by demodulating the received OFDM signal; and search means for searching for the common packet sequence needed to decode the original streams from the designated data packet sequence on the basis of the acquired decoding information.

Where the above-outlined reception apparatus, reception method, or program is in use, an orthogonal frequency division multiplexing signal known as an OFDM signal formed by modulating common packet sequences and data packet sequences is received. The common packet sequences are each made up of packets common to a plurality of streams, and the data packet sequences are each constituted by packets unique to each of the plurality of streams. Decoding information for decoding the original streams is then acquired from the common packet sequences and the data packet sequences obtained by demodulating the received OFDM signal. And a search is made for the common packet sequence needed to decode the original streams from the designated data packet sequence on the basis of the acquired decoding information.

According to an even further embodiment of the present invention, there is provided a reception system including: acquisition means for acquiring via a transmission channel an orthogonal frequency division multiplexing signal known as an OFDM signal formed by modulating common packet sequences and data packet sequences, the common packet sequences being made up of packets common to a plurality of streams, the data packet sequences being constituted by packets unique to each of the plurality of streams; and a transmission channel decoding process section configured to perform a transmission channel decoding process including at least a packet sequence decoding process on the OFDM signal acquired via the transmission channel. The transmission channel decoding process section includes: acquisition means for acquiring decoding information for decoding the original streams from the common packet sequences and the data packet sequences obtained by demodulating the OFDM signal received via the transmission channel; and search means for searching for the common packet sequence needed to decode the original streams from the designated data packet sequence on the basis of the acquired decoding information.

According to a still further embodiment of the present invention, there is provided a reception system including: a transmission channel decoding process section configured to perform a transmission channel decoding process including at least a packet sequence decoding process on an orthogonal frequency division multiplexing signal known as an OFDM signal acquired via a transmission channel and formed by modulating common packet sequences and data packet sequences, the common packet sequences being made up of packets common to a plurality of streams, the data packet sequences being constituted by packets unique to each of the plurality of streams; and an information source decoding process section configured to perform an information source decoding process including at least a data decompression process on the OFDM signal having undergone the transmission channel decoding process. The transmission channel decoding process section includes: acquisition means for acquiring decoding information for decoding the original streams from the common packet sequences and the data packet sequences obtained by demodulating the OFDM signal acquired via the transmission channel; and search means for searching for the common packet sequence needed to decode the original streams from the designated data packet sequence on the basis of the acquired decoding information.

According to a yet further embodiment of the present invention, there is provided a reception system including: a transmission channel decoding process section configured to perform a transmission channel decoding process including at least a packet sequence decoding process on an orthogonal frequency division multiplexing signal known as an OFDM signal acquired via a transmission channel and formed by modulating common packet sequences and data packet sequences, the common packet sequences being made up of packets common to a plurality of streams, the data packet sequences being constituted by packets unique to each of the plurality of streams; and an output section configured to output an image or a sound based on the OFDM signal having undergone the transmission channel decoding process. The transmission channel decoding process section includes: acquisition means for acquiring decoding information for decoding the original streams from the common packet sequences and the data packet sequences obtained by demodulating the OFDM signal acquired via the transmission channel; and search means for searching for the common packet sequence needed to decode the original streams from the designated data packet sequence on the basis of the acquired decoding information.

According to yet another embodiment of the present invention, there is provided a reception system including: a transmission channel decoding process section configured to perform a transmission channel decoding process including at least a packet sequence decoding process on an orthogonal frequency division multiplexing signal known as an OFDM signal acquired via a transmission channel and formed by modulating common packet sequences and data packet sequences, the common packet sequences being made up of packets common to a plurality of streams, the data packet sequences being constituted by packets unique to each of the plurality of streams; and a recording section configured to record the OFDM signal having undergone the transmission channel decoding process. The transmission channel decoding process section includes: acquisition means for acquiring decoding information for decoding the original streams from the common packet sequences and the data packet sequences obtained by demodulating the OFDM signal acquired via the transmission channel; and search means for searching for the common packet sequence needed to decode the original streams from the designated data packet sequence on the basis of the acquired decoding information.

Where any one of the above-outlined reception systems is in use, decoding information is first acquired for decoding original streams from common packet sequences and data packet sequences obtained by demodulating an OFDM signal. The OFDM signal is formed by modulating the common packet sequences and data packet sequences, the common packet sequences being made up of packets common to a plurality of streams, the data packet sequences being constituted by packets unique to each of the plurality of streams. And a search is made for the common packet sequence needed to decode the original streams from the designated data packet sequence on the basis of the acquired decoding information.

According to the present invention embodied illustratively as outlined above, the decoding process is performed appreciably faster than before.

BRIEF DESCRIPTION OF THE DRAWINGS

FIG. 20 is a schematic view showing a configuration example of a second embodiment of the reception system according to the present invention;

FIG. 21 is a schematic view showing a configuration example of a third embodiment of the reception system according to the present invention; and FIG. 22 is a schematic view showing a composition example of the hardware of a computer.

DETAILED DESCRIPTION OF THE PREFERRED EMBODIMENTS

Some preferred embodiments of the present invention will now be described by reference to the accompanying drawings.

[Typical Structure of the Reception Apparatus]

Figure 1:
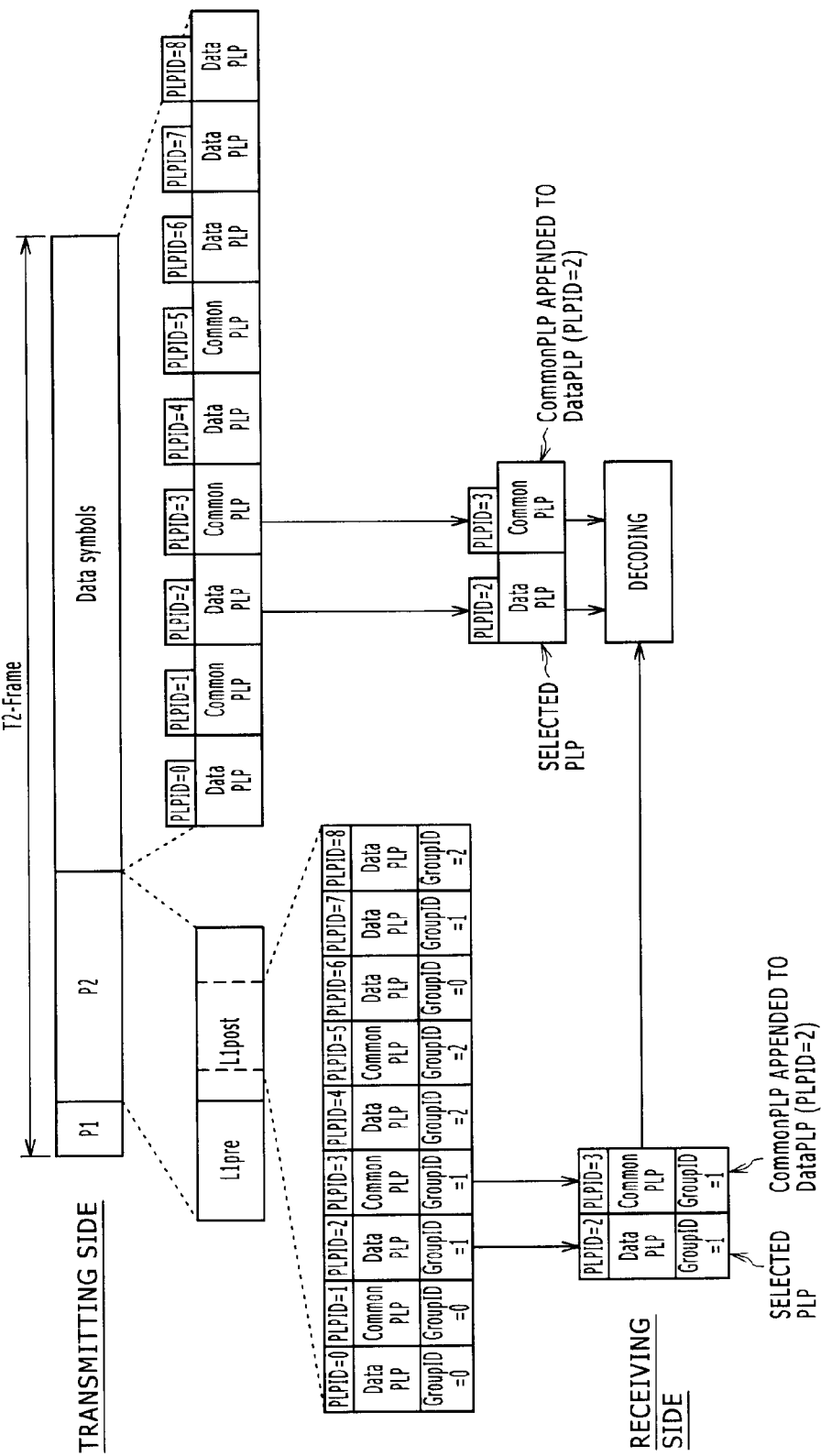
FIG. 1 is a schematic view showing the format of a T2 frame.
Figure 2:
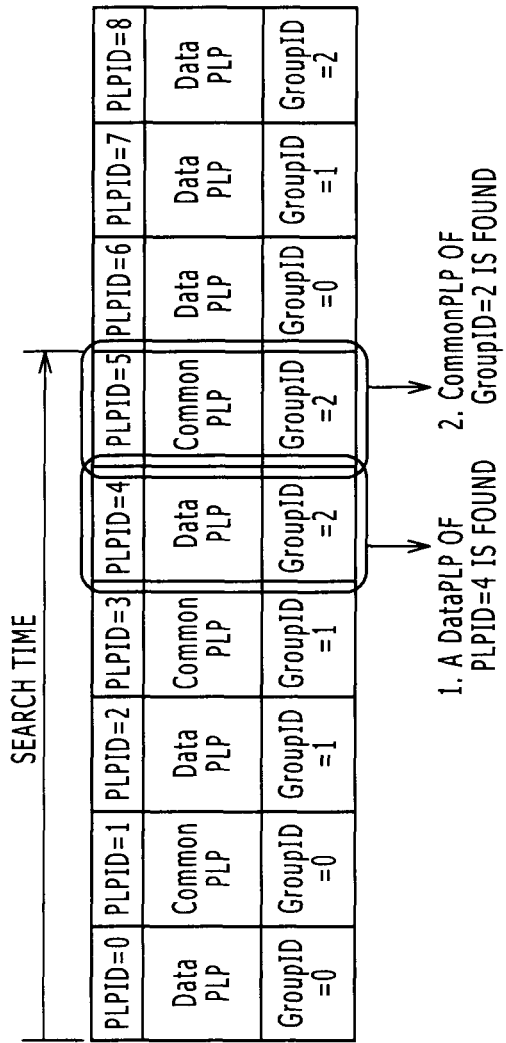
FIG. 2 is a schematic view explanatory of a PLP search process.
Figure 3:
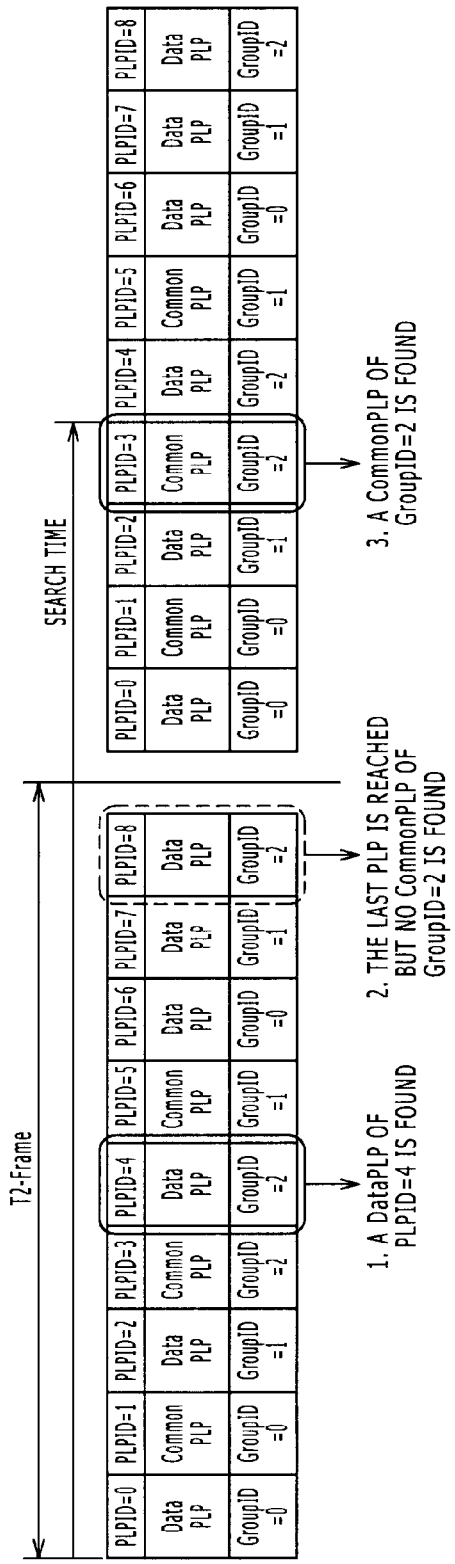
FIG. 3 is a schematic view explanatory of an ordinary PLP search process.
Figure 4:
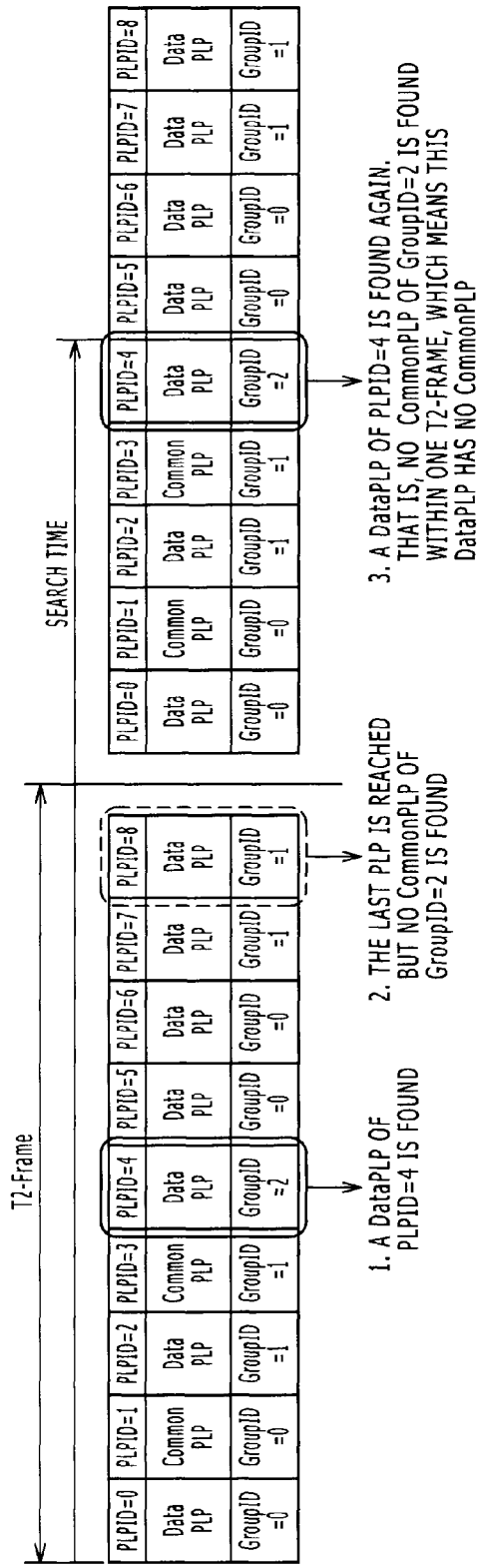
FIG. 4 is a schematic view explanatory of another ordinary PLP search process.
Figure 5:
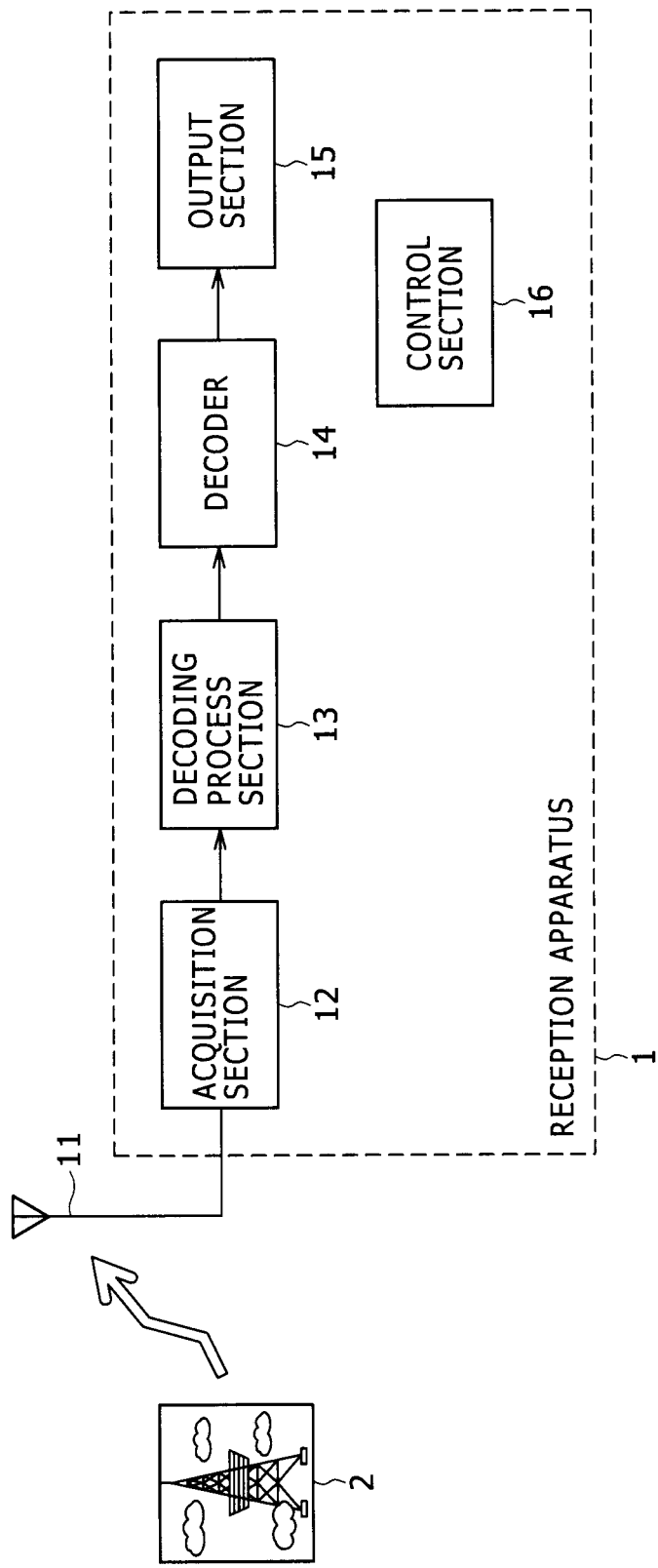
FIG. 5 is a block diagram showing a typical structure of a reception apparatus embodying the present invention.

FIG. 5 is a block diagram showing a typical structure of a reception apparatus 1 embodying the present invention. The reception system 1 receives a digital broadcast signal sent from a transmission apparatus 2. This signal is an OFDM signal (received signal) obtained by performing such processes as error correction and OFDM modulation on the PLP's (physical layer pipes) generated from transport streams (TS's) according to the M-PLP method under DVB-T2 being worked out as a standard for second generation digital terrestrial television broadcasting.

Illustratively, the transmission apparatus 2 such as a broadcasting station transmits the received signal of a digital broadcast via a transmission channel. The reception system 1 acquires the received signal sent from the transmission apparatus 2, performs a decoding process including demodulation and error correction on the received signal, and outputs decoding data resulting from the process to the downstream stage.

In the typical structure of FIG. 5, the reception apparatus 1 is made up of an antenna 11, an acquisition section 12, a decoding process section 13, a decoder 14, an output section 15, and a control section 16.

The antenna 11 captures the received signal sent from the transmission apparatus 2 over the transmission channel. The received signal is fed to the acquisition section 12.

The acquisition section 12 is illustratively composed of a tuner or a set-top box (STB). The acquisition section 12 frequency-converts the received signal (RF signal) coming from the antenna 11 into an IF (intermediate frequency) signal. The resulting IF signal is forwarded to the decoding process section 13.

The decoding process section 13 decodes the received signal coming from the acquisition section 12 into PLP's through such necessary processes as demodulation and error correction. From the PLP's, the decoding process section 13 restores TS's and feeds them to the decoder 14.

More specifically, the decoding process section 13 acquires desired Data PLP's and one Common PLP appended to the Data PLP's from the demodulated signal which is obtained by demodulating the received signal. A predetermined error correction process is performed on these PLP's.

Meanwhile, the transmission apparatus 2 encodes program data such as images and sounds using the MPEG (Moving Picture Experts Group) standard into MPEG-encoded data. The MPEG-encoded data is placed in TS packets making up transport streams (TS's) that are turned into PLP's. The transmission apparatus 2 transmits the PLP's thus generated as the received signal. Also, as a measure to counter errors that may occur over the transmission channel, the transmission apparatus 2 encodes the PLP's illustratively using the RS (Reed Solomon) code or LDPC (Low Density Parity Check) code.

As a result, the decoding process section 13 decodes the encoded data as part of its error correction process. The decoding process section 13 proceeds to restore the TS's from the decoded PLP's and supplies the result of the decoding to the decoder 14.

The decoder 14 decodes the encoded data contained in the TS's coming from the decoding process section 13 as per the MPEG standard. The data made up of the resulting images and sounds is fed to the output section 15.

The output section 15 is typically composed of a display and speakers. Given the image and sound data from the decoder 14, the output section 15 displays images and outputs sounds accordingly.

The control section 16 controls the components of the reception apparatus 1 including the decoding process section 13. A first and a second PLP search process to be carried out by the control section 16 will be discussed later in detail. The foregoing paragraphs have explained the typical structure of the reception apparatus 1.

[Typical Structure of the Control Section]

Figure 6:
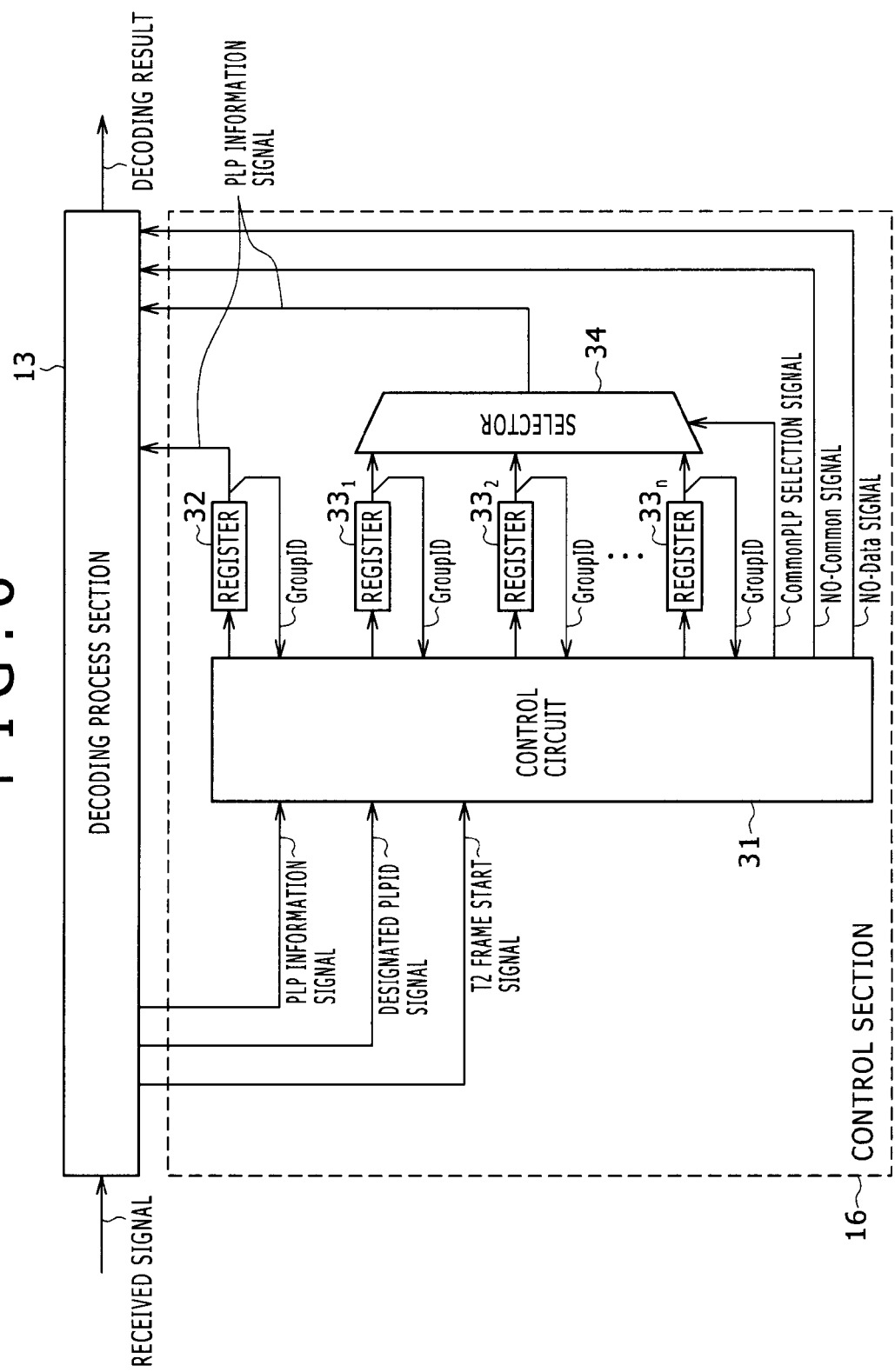
FIG. 6 is a block diagram showing a detailed structure of a control section.

FIG. 6 is a block diagram showing a detailed structure of the control section 16 included in FIG. 5. The control section 16 controls the decoding process section 13 performing the decoding process. As shown in FIG. 6, the control section 16 is made up of a control circuit 31, a register 32, registers $33_1$ through $33_n$ (n=1, 2, 3, ...), and a selector 34.

The control circuit 31 is supplied with a PLP information signal, a designated PLPID signal, and a T2 frame start signal (these signals are called the input signals collectively) from the decoding process section 13 in a suitably timed manner.

A more detailed explanation of the input signals is as follows: upon detecting the start of a T2 frame from the received signal, the decoding process section 13 generates a T2 frame start signal. The T2 frame start signal allows the control circuit 31 to determine the start position of a given T2 frame. Also, when the user designates desired service information, the decoding process section 13 generates a designated PLPID signal corresponding to the desired service information and feeds the generated PLPID signal to the control circuit 31.

Furthermore, during so-called channel scan, the decoding process section 13 demodulates P1 signaling from the T2 frame in which a P1 symbol is first detected. Then the demodulation section 21 carries out predetermined computations on a P2 symbol. When it becomes possible to demodulate the L1 pre-signaling included in the P2 symbol, data demodulation is made possible thereafter. This in turn makes it possible to extract PLP information from the L1 post-signaling, so that the decoding process section 13 generates the PLP information signal and feeds the generated signal to the control circuit 31.

Given the above-described input signals, the control circuit 31 sends to the register 32 a PLP information signal indicating the PLP type to be "data" from among the PLP information signals corresponding to the PLP information acquired from a given T2 frame. The control circuit 31 further supplies a PLP information signal indicating the PLP type to be "common" to one of the registers $33_1$ through $33_n$.

Also, the control circuit 31 identifies a Data PLP having a PLPID corresponding to the designated PLPID signal, and supplies the selector 34 with a signal for selecting the PLP information signal of the Common PLP appended to the identified Data PLP (the supplied signal is called the Common PLP selection signal hereunder). If there is no Common PLP appended to the Data PLP, then the control circuit 31 supplies the decoding process section 13 with a signal indicating the absence of a Common PLP (the signal is called the no-common signal hereunder). Furthermore, if there is no Data PLP having the PLPID corresponding to the designated PLPID signal, the control circuit 31 supplies the decoding process section 13 with a signal indicating the absence of the Data PLP (the signal is called the no-data signal hereunder).

The register 32 acquires and stores (i.e., holds) the PLP information signal which is fed from the control circuit 31 and which indicates the PLP type to be "data." Upon request from the control circuit 31, the register 32 supplies the control circuit 31 with a GroupID signal from among the PLP information signals held therein. The register 32 further feeds the PLP information signals held therein to the decoding process section 13.

The registers $33_1$ through $33_n$ (n=1, 2, 3, ...) each acquire and store a PLP information signal coming from the control circuit 31 and indicating the PLP type to be "common." That is, the registers $33_1$ through $33_n$ can store the Common PLP information signals of as many as n Common PLP's.

Upon request from the control circuit 31, the registers $33_1$ through $33_n$ supply the control circuit 31 with a GroupID signal from among the stored PLP information signals. The registers $33_1$ through $33_n$ also feed the stored PLP information signals to the selector 34.

Based on the Common PLP selection signal coming from the control circuit 31, the selector 34 selects one of the PLP information signals of the Common PLP's from among those stored in the registers $33_1$ through $33_n$. The selected PLP information signal is sent to the decoding process section 13.

[Explanation of the Reception Process]

Figure 7:
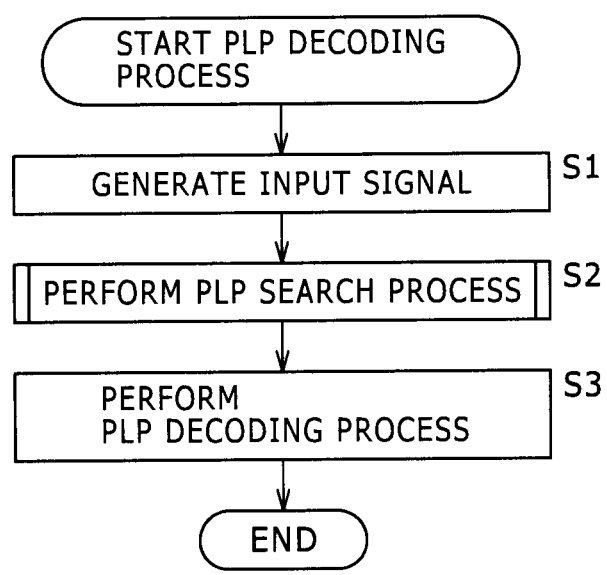
FIG. 7 is a flowchart explanatory of a PLP decoding process.

The PLP decoding process carried out by the decoding process section 13 and control section 16 is explained below by reference to the flowchart of FIG. 7. The antenna 11 captures the received signal sent from the transmission apparatus 2 and forwards the received signal to the acquisition section 12. The acquisition section 12 frequency-converts the received signal (RF signal) coming from the antenna 11 into an IF signal and sends the IF signal to the decoding process section 13.

In step S1, the decoding process section 13 generates a T2 frame start signal, a PLP information signal, or a designated PLP signal (i.e., input signal) from the received signal coming from the acquisition section 12. The input signal thus generated is fed to the control section 16.

In step S2, the control section 16 performs a PLP search process searching for Data PLP's and a Common PLP corresponding to the designated service information on the basis of the input signal from the decoding process section 13. The result of the PLP search process is sent to the decoding process section 13. The PLP search process carried out by the control section 16 will be discussed later in more detail as a first through a fifth PLP search process.

In step S3, the decoding process section 13 performs a PLP decoding process decoding the PLP's from the Common PLP and Data PLP's based on the PLP information signal acquired through the PLP search process. The foregoing paragraphs have shown how the PLP decoding process is carried out.

[Explanation of the First PLP Search Process]

Figure 8:
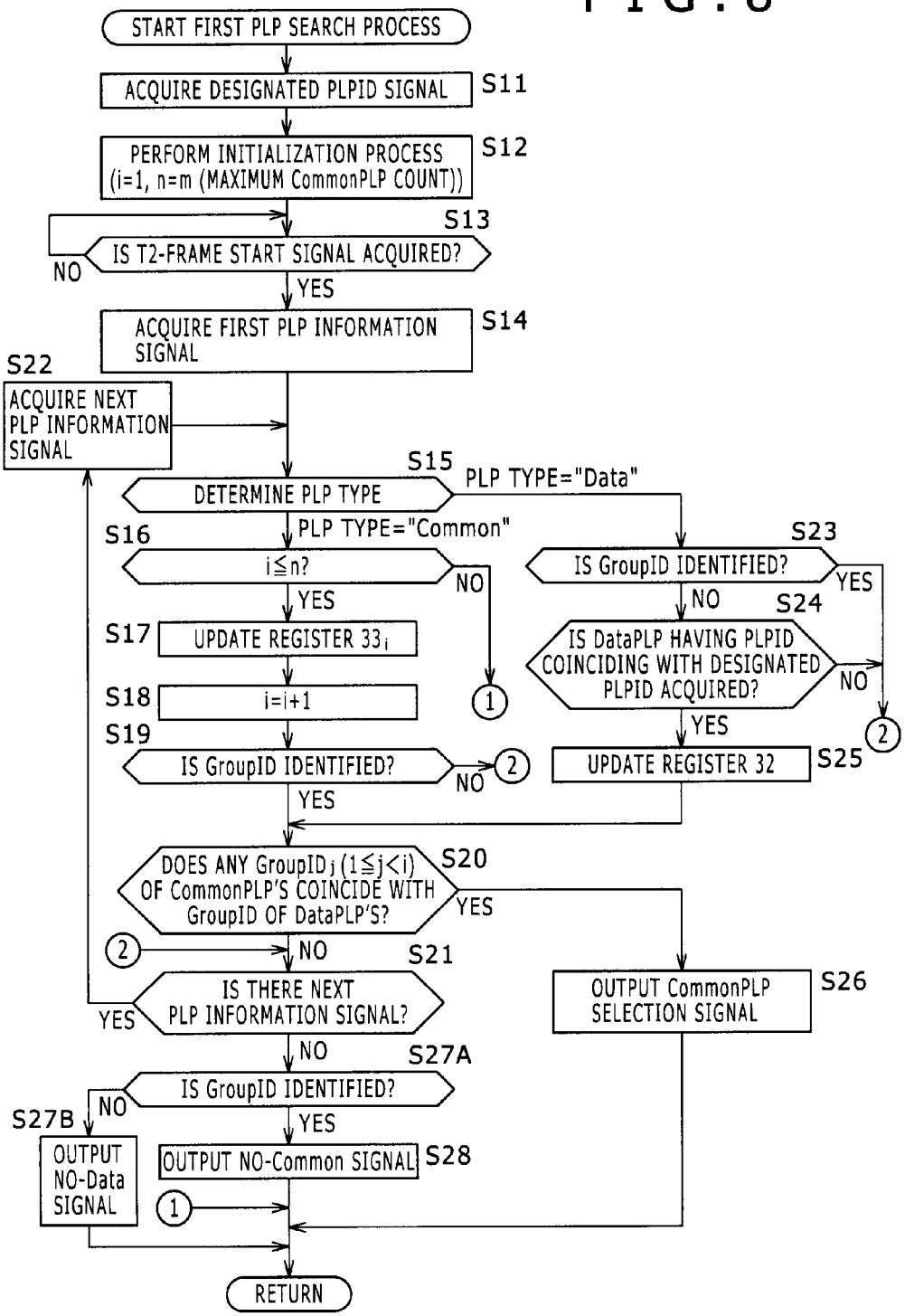
FIG. 8 is a flowchart explanatory of a first PLP search process.

FIG. 8 is a flowchart explanatory of the first PLP search process. When the user designates service information, the control circuit 31 goes to step S11 and acquires a designated PLPID signal corresponding to the designated service information. In step S12, the control circuit 31 performs an initialization process.

In the initialization process of the first PLP search process, a counter (i) is initialized and a value (n) is set for the registers 33. The value n denotes the number of registers $33_1$ through $33_n$. Where the relationship of n=m is defined, the value m represents a maximum PLP count that the system can take. Under DVB-T2, the value m is set to be 85. Thus the control section 16 in FIG. 6 has 85 registers 33 installed therein. During the initialization process, the value i is illustratively set to be 1 and the value n to be 85.

In step S13, the control circuit 31 checks to determine whether a T2 frame start signal is acquired. If the T2 frame start signal is found acquired, step S14 is reached. In step S14, the control circuit 31 obtains the first PLP information signal (i.e., PLPID=0). In step S15, the control circuit 31 determines the PLP type based on PLP type information included in the acquired PLP information signal.

If in step S15 the PLP type is found to be "common," then step S16 is reached. In step S16, the control circuit 31 checks to determine whether a relationship of i≤n is satisfied.

That is, the determination process of step S15 involves checking to see if there exist the registers $33_n$ for storing the PLP information signals of which the PLP type is found to be "common." In the case of the first PLP search process, there are provided registers $33_1$ through $33_{85}$ as per the maximum Common PLP count (m=85) under DVB-T2. That means there is no possibility of the result of step S16 being i>n (i.e., leading to "No" in step S16). If, however, this is the case for some reason, then the first PLP search process is terminated.

In step S16, a check is made to determine whether the relationship of i≤n is satisfied, i.e., whether there exists the register $33_i$ corresponding to the i-th Common PLP. If the result of the check in step S16 is affirmative, then step S17 is reached. In step S17, the control circuit 31 updates the register $33_i$ using the PLP information signal of the acquired Common PLP. In step S18, the control circuit 31 increments the value i by 1. This allows the register $33_i$ to hold the PLP information signal of the i-th Common PLP.

In step S19, the control circuit 31 checks to determine whether a GroupID is identified following acquisition of the Data PLP having a PLPID coinciding with the designated PLPID. If in step S19 no GroupID is found identified, step S21 is reached. In step S21, the control circuit 31 checks to determine whether the next PLP information signal exists (e.g., after acquisition of the PLP information of PLPID=0, see if the PLP information of PLPID=1 exists). If in step S21 the next PLP information signal is found to exist, then step S22 is reached and the next PLP information signal is acquired.

Again in step S15, the control circuit 31 determines the PLP type of the next PLP information signal thus acquired. If the PLP type is found to be "common" in the manner described above, the PLP information signal of the i-th Common PLP is written to the register $33_i$. Then the next PLP signal information is acquired. If in step S15 the PLP type is found to be "data," then control is passed on to step S23.

In step S23, the control circuit 31 checks to determine whether a GroupID is identified. If any GroupID has yet to be identified, then step S24 is reached. In step S24, the control circuit 31 checks to determine whether the PLPID included in the PLP information signal of the acquired Data PLP coincides with the designated PLPID.

If in step S24 the PLPID's are not found to match, control is passed on to step S21. In step S21, a check is made to determine whether the next PLP information signal exists. If the next PLP information signal is found to exist, then control is returned to step S22 and the subsequent steps are repeated as explained above.

That is, the PLP type is determined regarding the PLP information signal acquired every time PLPID is incremented by 1 (=0, 1, 2, 3, ... ). Each time the PLP type is found to be "common," the register $33_i$ is updated successively (1≤i≤n). The PLP information signals of the first through the i-th Common PLP's are placed into the registers $33_1$ through $33_i$, respectively (in steps S14 through S19, S21, and S22). On the other hand, whenever the PLP type is found to be "data," a check is made to determine whether the PLP IS's match (in steps S14, S15, S23, S24, S21, and S22).

If in step S24 the PLPID's are found to match, then step S25 is reached. In step S25, the control circuit 31 updates the register 32 using the PLP information signal of the acquired Data PLP. This allows the register 32 to hold the PLP information signal of the Data PLP corresponding to the designated PLPID.

In step S20, the control circuit 31 checks to determine whether any of the $GroupID_j$ (1≤j<i) included in the PLP information signals of the Common PLP's held in the registers $33_1$ through $33_i$ coincides with the GroupID (called the specific GroupID) included in the PLP information signal of the Data PLP placed in the register 32.

If in step S20 the $GroupID_j$ coinciding with the specific GroupID is found to exist, then step S26 is reached. In step S26, the control circuit 31 supplies the selector 34 with a Common PLP selection signal for selecting the output from the register $33_j$ that retains the PLP information signal including the $GroupID_j$ coinciding with the specific GroupID. This step brings the first PLP search process to an end.

Given the Common PLP selection signal, the selector 34 selects the output from the register $33_j$ that holds the PLP information signal including the $GroupID_j$ coinciding with the specific GroupID, and sends what is selected to the decoding process section 13. At this point, the register 32 supplies the PLP information signal of the Data PLP to the decoding process section 13. In turn, the decoding process section 13 performs a PLP decoding process using the designated Data PLP and the Common PLP appended to that Data PLP.

If in step S20 there is found no GroupID coinciding with the specific GroupID, then step S21 is reached. In step S21, a check is made to determine whether the next PLP information exists. If the next PLP information is found to exist, then step S22 is reached again and the subsequent steps are repeated as explained above.

That is, if the PLP type remains "common" until one T2 frame comes to an end, the PLP information signal in question is held in the register $33_i$, and a check is made to determine whether the $GroupID_j$ coincides with the specific GroupID. If these GroupID's are found to match, then the register $33_i$ is selected and its PLP information signal is fed to the decoding process section 13. If the PLP type is found to be "data," that means the GroupID has already been identified ("No" in step S23). In this case, the register 32 is not updated, and only the PLP information about the PLP type being "common" is processed.

In reference to the flowchart of FIG. 8, it was explained for purpose of simplification and illustration that after the identification of the GroupID, the PLP information of the i-th Common PLP is placed unconditionally into the register $33_i$ before the GroupID's are compared for a match. However, it is not necessary immediately to write the PLP information in question to the register 33. In other words, the control circuit 31 may compare the GroupID included in the PLP information of the acquired Common PLP directly with the specific GroupID. Only in the case of a match between the GroupID's, the control circuit 31 can place the PLP information in question into the register $33_i$.

If in step S21 the next PLP information is found absent, then step S27A is reached. In step S27A, a check is made to determine whether the GroupID is identified. If in step S27A the GroupID is found identified, that means there exists no Common PLP that would have the specific GroupID from beginning to end of one T2 frame.

In the case above, there is no Common PLP appended to the Data PLP. In that case, step S28 is reached and the control circuit 31 sends a no-common signal to the decoding process section 13. This step terminates the first PLP search process. This causes the decoding process section 13 to perform a PLP decoding process only on the designated Data PLP. If in step S27A no GroupID is found identified, that means there is no Data PLP corresponding to the designated PLPID signal. The control circuit 31 then goes to step S27B and supplies a no-data signal to the decoding process section 13. This step brings the process to an end.

In the first PLP search process, as described above, the PLP information about the Common PLP is acquired and stored until the GroupID is identified. This makes it possible to terminate the PLP search process always within one T2 frame. The decoding process section 13 can then perform a fast decoding process using the PLP information acquired quickly through such PLP search.

More specific examples of the first PLP search process are explained below by reference to FIGS. 9 and 10. The designated PLPID is assumed to be 4 in both FIG. 9 and FIG. 10.

Figure 9:
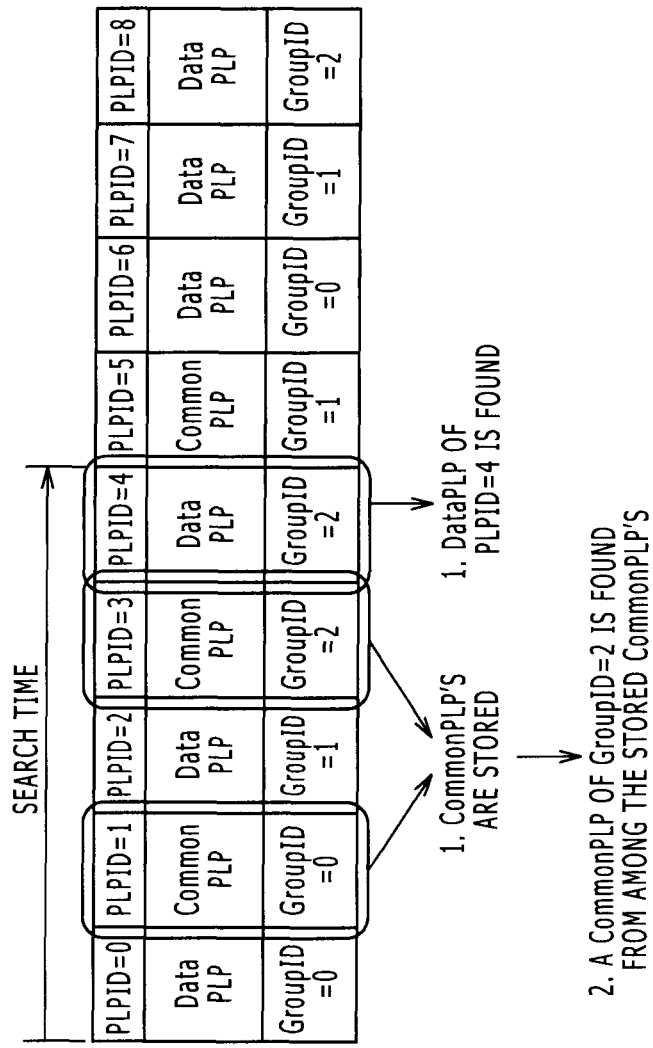
FIG. 9 is a schematic view showing a specific example of the first PLP search process.

In the example of FIG. 9, a search is started from the beginning. The fifth Data PLP from the beginning has PLPID=4. At PLPID=1 and PLPID=3 prior to PLPID=4, the PLP type is "common." Thus the PLP information of PLPID=1 is written to the register $33_1$ and the PLP information of PLPID=3 to the register $33_2$. Because GroupID=2 is contained in the PLP information of PLPID=4, a GroupID coinciding with the specific GroupID=2 is to be identified from among the GroupID's contained in the PLP information held in the registers $33_1$ and $33_2$. In FIG. 9, the PLP information of PLPID=3 held in the register $33_2$ is GroupID=2, so that the Common PLP of PLPID=3 is identified as the Common PLP appended to the Data PLP of PLPID=4.

During the time of search from PLPID=0 to PLPID=4 in the PLP search process of FIG. 9, the Common PLP appended to the Data PLP is identified.

Figure 10:
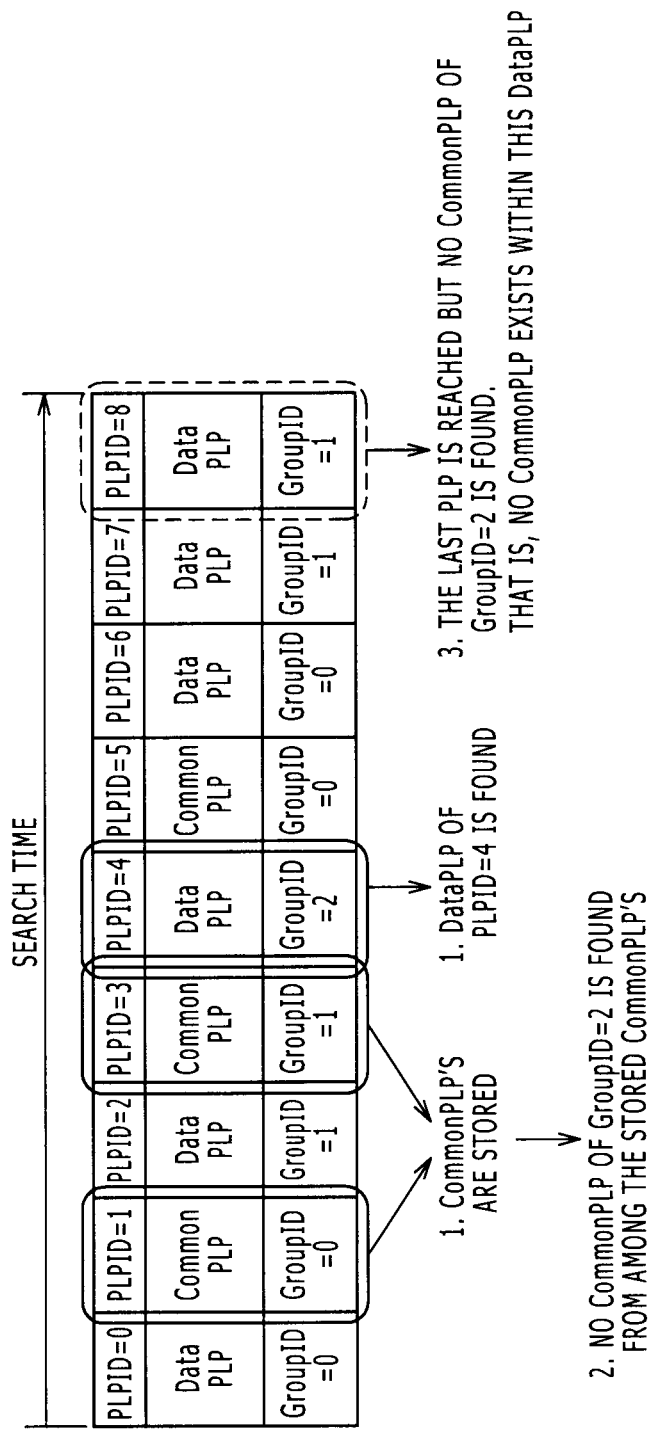
FIG. 10 is a schematic view showing another specific example of the first PLP search process.

In the example of FIG. 10, the PLP information of PLPID=1 and PLPID=3 is placed into the registers $33_1$ and $33_2$ respectively until the Data PLP of PLPID=4 is found through the search. Among the GroupID's contained in the PLP information held in these registers, there is no GroupID coinciding with the specific GroupID=2. In this case, a search is made after PLPID=5 for PLP information of which the PLP type is "common" and which contains GroupID=2. In the example of FIG. 10, no such PLP information exists; the Common PLP of GroupID=2 is not found when the last PLPID=8 is reached following the search. In this case, a no-common signal is output because there is no Common PLP appended to the Data PLP.

In the PLP search process of FIG. 10, it is found that during the time of search from PLPID=0 to PLPID=8, there is found no Common PLP appended to the Data PLP.

In the first PLP search process, as described, the time required for PLP acquisition is complete within a single T2 frame. Because there is no need to perform a PLP search for the next T2 frame, the search time can be shortened so that the PLP decoding process can be made faster than before.

[Explanation of the Second PLP Search Process]

In the first PLP search process, as explained above, the number (n) of registers 33 is arranged to coincide with the maximum number (m) of Common PLP's. It follows that the PLP information of all Common PLP's can be held in the registers $33_1$ through $33_n$. However, preparing as many as m registers 33 can be an onerous exercise; it may not be such a good idea to set the register count (=n) equal to the maximum Common PLP count (=m).

In the second PLP search process, by contrast, the number (n) of registers 33 is brought to within a range of $1 \leq n \leq m$. Although this arrangement cannot accommodate the PLP information of all Common PLP's, it can appreciably reduce the number of registers 33.

Figure 11:
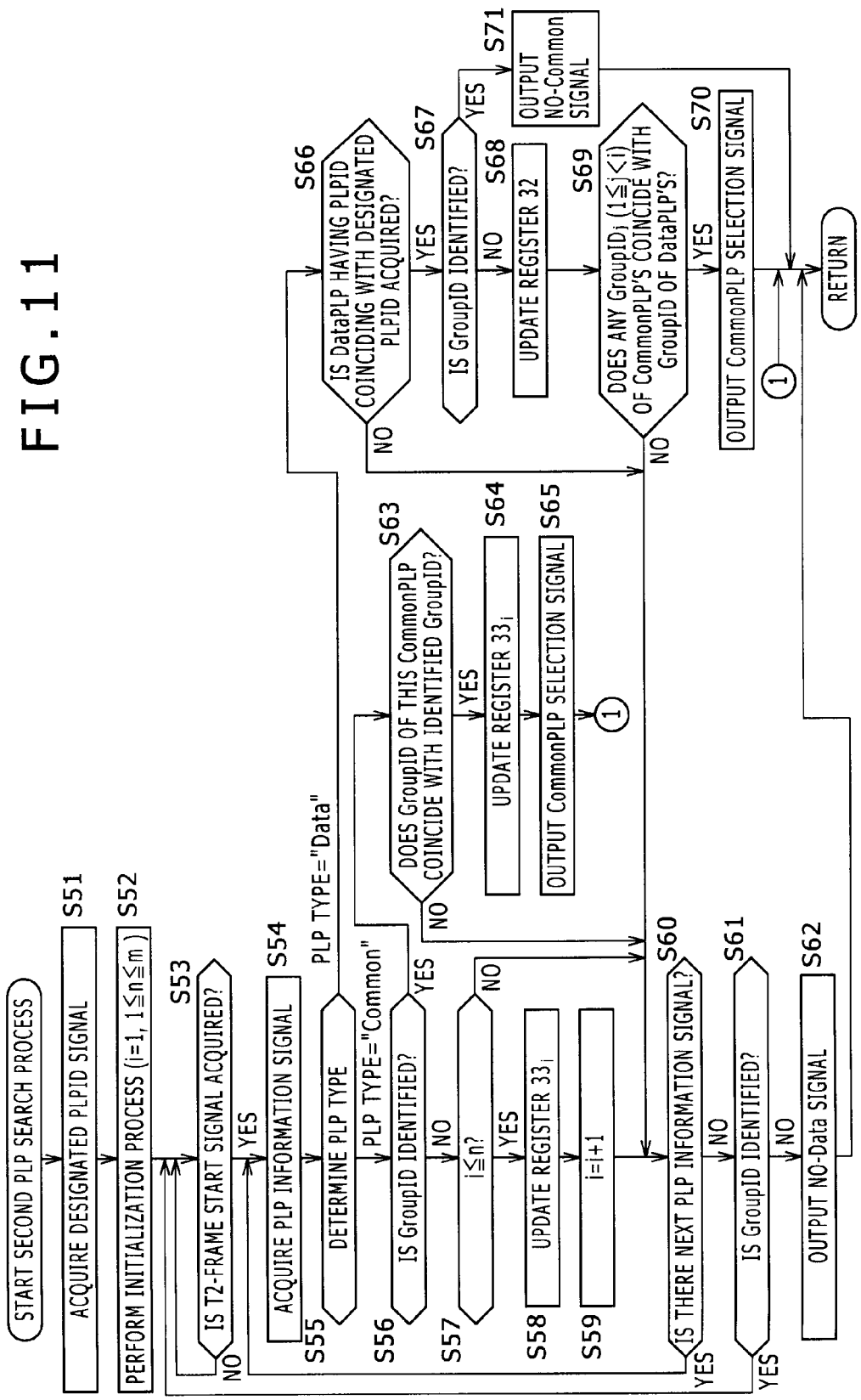
FIG. 11 is a flowchart explanatory of a second PLP search process.

FIG. 11 is a flowchart explanatory of the second PLP search process. In step S51, the control circuit 31 acquires a designated PLPID signal. In step S52, the control circuit 31 carries out an initialization process.

In the initialization process of the second PLP search process, the initial value i on the counter for registers 33 is set to 1, and the value n representing the number of registers 33 is established ($1 \leq n \leq m$). Since the value m is set to 85 under DVB-T2 as mentioned above, the value n is determined in a manner meeting the range of $1 \leq n \leq 85$.

In steps S53 through S55, as in steps S13 through S15 of FIG. 8, a T2 frame start signal is acquired; a PLP information signal is acquired; and the PLP type is determined. If in step S55 the PLP type is found to be "common," then control S56 is reached. In step S56, the control circuit 31 checks to determine whether a GroupID is identified.

If in step S56 no GroupID is identified, then step S57 is reached. In step S57, the control circuit 31 checks to determine whether a relationship of $i \leq n$ is satisfied. If in step S57 the relationship of $i \leq n$ is found satisfied, i.e., if the register $33_i$ corresponding to the i-th Common PLP is found to exist, then step S58 is reached. In step S58, the control circuit 31 updates the register $33_i$ using the PLP information signal of the acquired Common PLP. In step S59, the control circuit 31 increments the value i by 1. This allows the register $33_i$ to hold the PLP information of the i-th Common PLP. If in step S57 the relationship of $i \leq n$ is not found satisfied, then steps S58 and S59 are skipped and step S60 is reached. In this case, the register $33_i$ will not be updated.

In step S60, the control circuit 31 checks to determine whether the next PLP information signal exists. If the next PLP information signal is found to exist, step S54 is reached again and the next PLP information signal is acquired. In step S55, the control circuit 31 again determines the PLP type of the next PLP information signal acquired. If the PLP type is found to be "data," then step S66 is reached.

In step S66, the control circuit 31 checks to determine whether the PLPID included in the PLP information signal of the acquired Data PLP coincides with the designated PLPID.

If in step S66 the Data PLP having a PLPID coinciding with the designated PLPID is found acquired, then step S67 is reached. In step S67, the control circuit 31 checks to determine whether the GroupID is identified. If in step S67 no GroupID is found identified, then step S68 is reached. In step S68, the control circuit 31 updates the register 32 using the PLP information signal of the acquired Data PLP. This allows the register 32 to hold the PLP information signal of the Data PLP corresponding to the designated PLPID, whereby the GroupID is identified.

In step S69, the control circuit 31 checks to determine whether any of the GroupID$_j$ ($1 \leq j < i$) included in the PLP information signals of the Common PLP's held in the registers $33_1$ through $33_i$ coincides with the GroupID (specific GroupID) included in the PLP information signal of the Data PLP placed in the register 32.

If in step S69 the GroupID$_j$ coinciding with the specific GroupID is found to exist, then step S70 is reached. In step S70, the control circuit 31 supplies the selector 34 with a Common PLP selection signal for selecting the output from the register $33_j$ that retains the PLP information signal including the GroupID$_j$ coinciding with the specific GroupID. This step brings the second PLP search process to an end.

If the PLPID's are not found to match ("No" in step S66), or if there is found no GroupID coinciding with the specific GroupID ("No" in step S69), then step S60 is reached. In step S60, a check is made to determine whether the next PLP information signal exists ("Yes" in step S60). If the result of the check in step S60 is affirmative, then step S54 is reached again and the subsequent steps are repeated as described above regarding the next PLP information signal acquired anew.

If the PLP information signal of which the PLP type is "common" is acquired following identification of the GroupID, then step S63 is reached. In step S63, the control circuit 31 checks to determine whether the GroupID included in the PLP information signal of the Common PLP coincides with the specific GroupID. If in step S63 the GroupID's are found to match, then step S64 is reached. In step S64, the control circuit 31 updates the register $33_i$ using the PLP information signal of the acquired Common PLP. In step S65, the control circuit 31 sends the corresponding Common PLP selection signal to the selector 34. This brings the second PLP search process to an end. If in step S63 the GroupID's are not found to match, then step S60 is reached again and the subsequent steps are repeated.

While the steps are being repeated, it may be found in step S60 that the next PLP information signal does not exist. If that is the case, step S61 is reached. In step S61, a check is made to determine whether the GroupID is identified. If no GroupID is found identified in step S61, then the control circuit 31 sends a no-data signal to the decoding process section 13 and brings the search process to an end. In this case, the next PLP information signal is not found to exist ("No" in step S60), so that the GroupID has yet to be identified although the PLP search is completed within one T2 frame. This means that the Data PLP corresponding to the designated PLPID does not exist. Hence comes the output of the no-data signal.

If in step S61 the GroupID is found identified, then step S53 is reached again and the subsequent steps are repeated. Following acquisition of a second T2 frame start signal ("Yes" in step S53), the same PLP search process is performed on the second T2 frame as on the first T2 frame.

That is, a search is made through the second T2 frame for a Common PLP having a GroupID coinciding with the specific GroupID. When the desired Common PLP is identified, the corresponding Common PLP selection signal is sent to the selector 34. By contrast, it might happen that although the PLP search through the first T2 frame resulted in the acquisition of the Data PLP having the PLPID coinciding with the designated PLPID, another Data PLP having the same PLPID is acquired in the second T2 frame. If that happens, that means the PLP search process has completed a full circle ("Yes" in step S67). In this case, there is no use performing continuously the PLP search process searching for the desired Common PLP. Thus the control circuit 31 goes to step S71, outputs a no-common signal to the decoding process section 13, and terminates the search process.

As described above, the second PLP search process entails the reduced number of registers for storing the PLP information of Common PLP's. If the desired PLP information is identified from within the first T2 frame, then the PLP search process is finished rapidly within one T2 frame. This allows the decoding process section 13 to perform its decoding process at high speed.

Where the value n is smaller than the value m, that means the number of registers 33 is smaller than the number of Common PLP's. In such a case, the PLP search process may not be completed within the first T2 frame. But the search can be continued past the first T2 frame and into the second T2 frame for the desired PLP.

Figure 12:
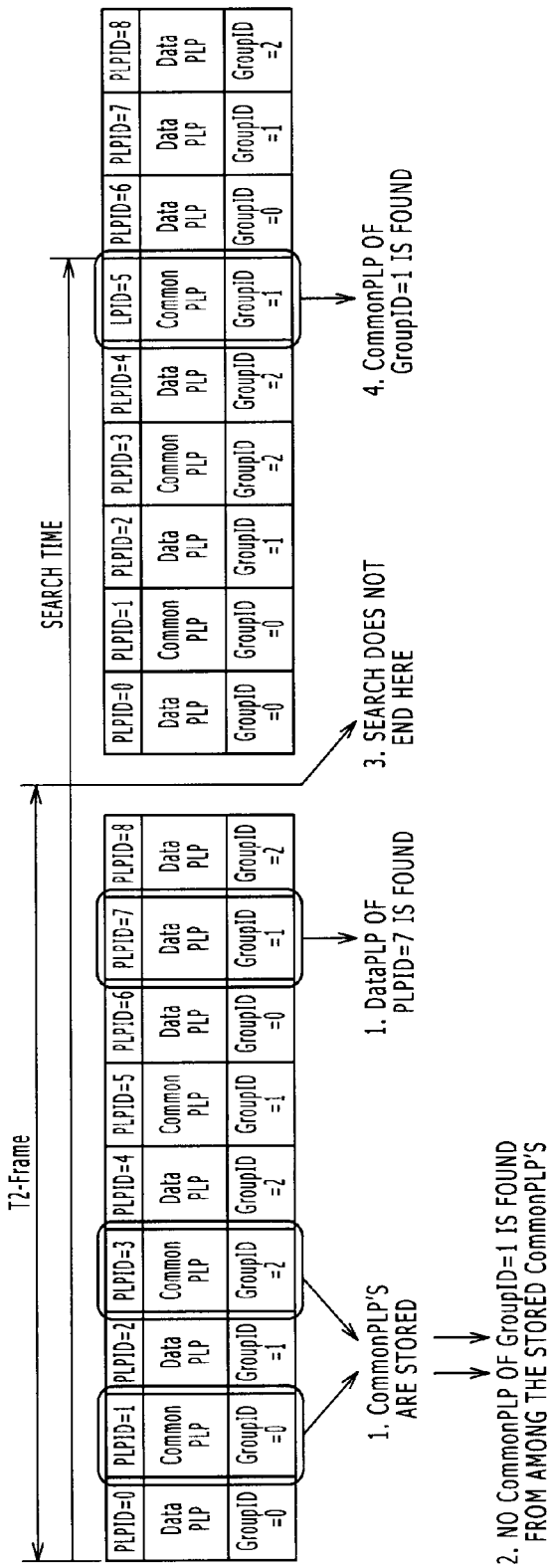
FIG. 12 is a schematic view showing a specific example of the second PLP search process.

A more specific example of the second PLP search process is explained below by reference to FIG. 12. In the example of FIG. 12, the designated PLPID is assumed to be 7. In order to reduce the number of registers 33, only two registers $33_1$ and $33_2$ are provided (i.e., n=2).

In the case of FIG. 12, a search is started from the beginning. The search finds both the second PLPID=1 and the fourth PLPID=3 to be "common" in PLP type. This sets the PLP information of PLPID=1 to the register $33_1$ and the PLP information of PLPID=3 to the register $33_2$. Although the sixth PLPID=5 is also "common" in PLP type, the PLP information of PLPID=5 is not retained because there are only two registers 33, and the search is continued for the desired Data PLP.

The continuous PLP search finds the eighth Data PLP from the beginning to be PLPID=7, so that the PLP information of PLPID=7 is set to the register 32. The search is supposed to identify a GroupID coinciding with the specific GroupID contained in the PLP information, from among the GroupID's held in the PLP information placed in the registers $33_1$ and $33_2$. Since no matching GroupID is found, the next T2 frame is acquired. Into the second T2 frame, the sixth PLPID=5 from the frame top turns out to be "common" in PLP type and has GroupID=1. Thus the Common PLP of PLPID=5 appended to the Data PLP of PLPID=7 is identified.

In the case of FIG. 12, the search is made through the first T2 frame and then into the second T2 frame until PLPID=5 is encountered. This allows the Common PLP appended to the Data PLP to be identified.

In the example of FIG. 12, it was assumed for purpose of simplification and illustration that there are two registers. This may have given the impression that there are too few registers 33 so that it is necessary always to search through the second T2 frame. That is not the case in practice. The value n is determined in consideration of a tradeoff between the need for accelerating the decoding process of the decoding process section 13 on the one hand the affordable number of registers 33 on the other hand. If the priority is on acceleration of the decoding process of the decoding process section 13, then the number of registers 33 may be arranged to be increased (i.e., value n made larger). This arrangement boosts the possibility of identifying the PLP within the first T2 frame, so that the decoding process can be accelerated in most cases.

That is, if the number of registers 33 is lowered, the scope of circuitry is reduced but it may take longer to perform the search. Still, the decoding process is carried out faster using the above arrangement than with ordinary setups.

[Explanation of the Third PLP Search Process]

In connection with the first PLP search process, one Common PLP was assumed relative to one Data PLP. However, this is not limitative of the present invention. There may be a plurality of Common PLP's (represented by the value x). What follows is an explanation of the third PLP search process in effect where there is more than one Common PLP ($x \geq 1$ (x: known value)).

Figure 13:
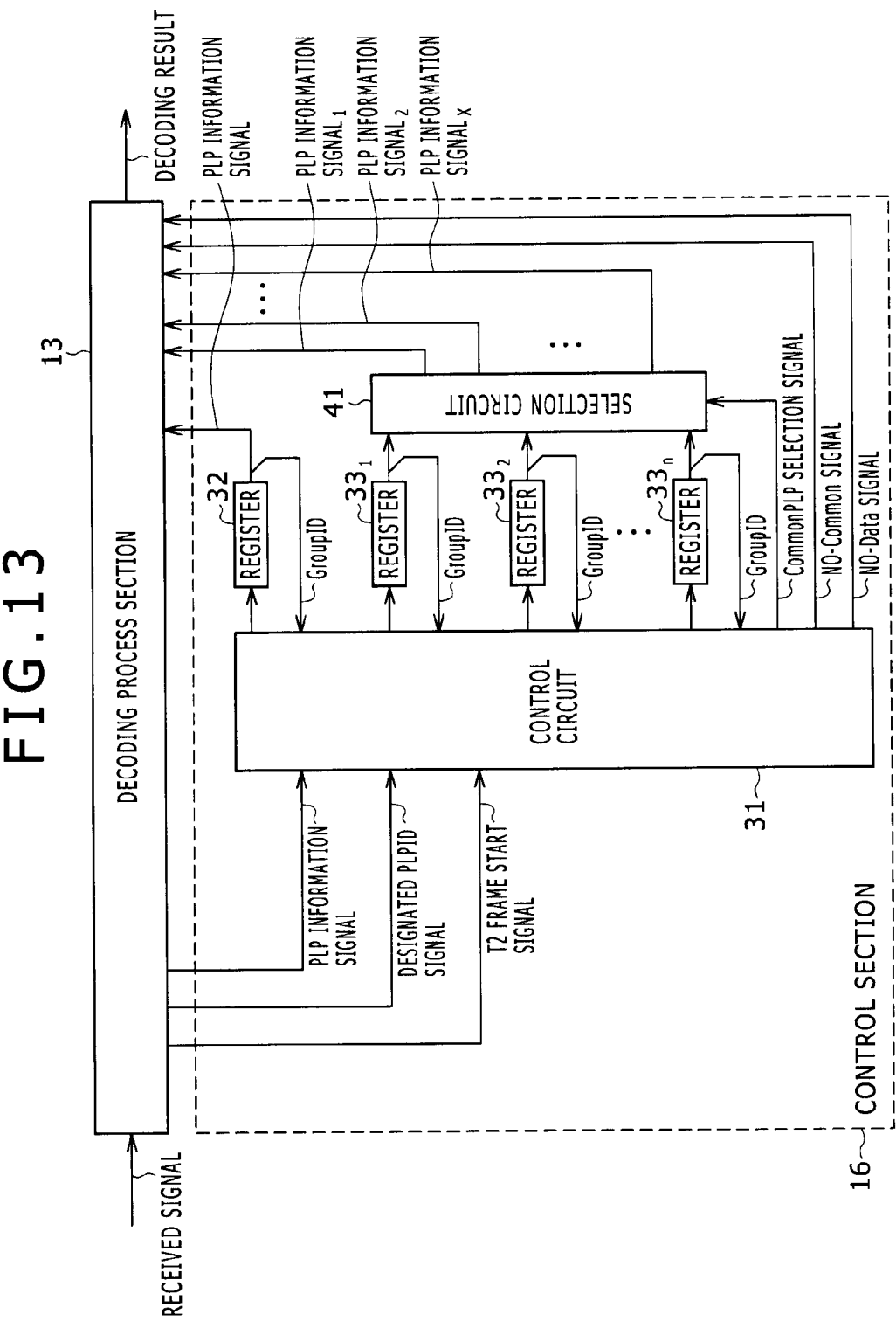
FIG. 13 is a block diagram showing another detailed structure of the control section.

FIG. 13 is a block diagram showing another typical structure of the control section 16. In FIG. 13, the components also found in FIG. 6 are designated by like reference numerals, and their descriptions will be omitted hereunder where redundant.

The control section 16 in FIG. 13 differs from its counterpart in FIG. 6 in that a selection circuit 41 replaces the selector 34. The selection circuit 41 is supplied with a Common PLP selection signal from the control circuit 31. In response to the Common PLP selection signal, the selection circuit 41 selects PLP information input from any one of the registers $33_1$ through $33_n$ and outputs what is selected to the decoding process section 13.

In the structure of FIG. 13, the number of Common PLP's may turn out to be smaller than a predetermined Common PLP count x. In such a case, the control circuit 31 sends to the decoding process section 13 a common-lacking signal indicating that the number of Common PLP's falls short of the predetermined count.

The third PLP search process will now be explained by reference to the flowchart of FIG. 14. In step S91, the control circuit 31 acquires the designated PLPID signal. In step S92, the control circuit 31 performs an initialization process.

In the initialization process of the third PLP search process, the initial value i on the counter for registers 33 is set to 1 (i=1); the number n of registers 33 is set to a value m (=maximum Common PLP (information signal) count) (n=m); the number x of Common PLP's is set to a known value; and the initial value y on the counter for Common PLP's is set to 0 (y=0).

Steps S93 through S105 are carried out in the same manner as steps S13 through S25 in FIG. 8. With a T2 frame started, the control circuit 31 searches for a Common PLP appended to the designated Data PLP.

In step S100, the control circuit 31 checks to determine whether any of the GroupID$_j$ (1≤j<i) included in the PLP information signals of the Common PLP's held in the registers 33$_1$ through 33$_j$ coincides with the specific GroupID.

If in step S100 the GroupID$_j$ coinciding with the specific GroupID is found to exist, step S106A is reached. In step S106A, the control circuit 31 increments the value y by 1. In step S106B, the control circuit 31 supplies the selection circuit 41 with a Common PLP selection signal for selecting the output from the register 33$_j$. The signal causes the selection circuit 41 to send the output from the register 33$_j$ to the decoding process section 13 as a PLP information signal y (1≤y≤x).

That is, the Common PLP selection signal is an instruction that causes the selection circuit 41 to select, from among the PLP information signals 1 through i retained in the registers 33$_1$ through 33$_j$, the PLP information signals 1 through x corresponding to the known value x and to output the selected signals. Illustratively, if a first Common PLP is acquired, the control circuit 31 outputs a Common PLP selection signal for outputting the input from the register 33$_j$ as a PLP information signal 1. Likewise, when a second or a subsequent Common PLP is acquired, the control circuit 31 outputs a Common PLP selection signal for selectively outputting a PLP information signal y from the corresponding register 33$_j$.

In step S106C, the control circuit 31 checks to determine whether the relationship of x==y is satisfied, i.e., whether all Common PLP's relative to the desired Data PLP have been identified. If in step S106C not all Common PLP's are found to have been identified yet, then step S101 is reached and the above-described process is repeated.

That is, if the GroupID contained in the PLP information of which the PLP type is "common" is found to coincide with the specific GroupID, the selection circuit 41 is supplied with a Common PLP selection signal for causing the output from the register 33$_j$ holding the matching GroupID to be output as the PLP information signal y. At this point, the value y is incremented by 1. When another Common PLP having the matching GroupID is acquired anew, the value y approaches the value x. When all Common PLP's relative to the desired Data PLP are eventually acquired, the relationship of x==y is met ("Yes" in step S106C) and the search process is terminated.

In the manner described above, the PLP information of all Common PLP's relative to the desired Data PLP is fed to the decoding process section 13. In turn, the decoding process section 13 performs its PLP decoding process using the designated Data PLP and the predetermined number of Common PLP's appended to that Data PLP.

In step S107A, as in step S27A of FIG. 8, the control circuit 31 checks to determine whether the GroupID is identified. If in step S107A no GroupID is found identified yet, step S107B is reached. In step S107B, the control circuit 31 sends a no-data signal to the decoding process section 13 and brings the search process to an end. If in step S107A the GroupID is found identified, then step S108A is reached. In step S108A, the control circuit 31 checks to determine whether the relationship of y<x is satisfied, i.e., whether all Common PLP relative to the desired Data PLP have been acquired.

If in step S108A not all Common PLP's are found acquired yet, step S108B is reached. In step S108, the control circuit 31 sends a common-lacking signal to the decoding process section 13 and terminates the search process. If in step S108A all Common PLP's are found to have been acquired, then there is no need to output the common-lacking signal. In that case, step S108B is skipped and the search process is brought to an end.

For the third PLP search process, as described above, even where a predetermined number of Common PLP's exist relative to the desired Data PLP, the PLP search process is always finished within one T2 frame. Thus the decoding process section 13 can perform its decoding process at high speed using the PLP information acquired rapidly through the above-described PLP search process.

[Explanation of the Fourth PLP Search Process]

In the third PLP search process above, as in the first PLP search process discussed earlier, the number n of registers 33 coincides with the maximum Common PLP count (m). While it is possible for the PLP information of all Common PLP's to be held in the registers 33$_n$, this entails preparing the numerous registers 33. In the fourth PLP search process, as in the second PLP search process described above, the number n of registers 33 is set in such a manner that a relationship of 1≤x≤n≤m is satisfied. Although it is impossible to accommodate the PLP information of all Common PLP's, the number of registers 33 can be reduced appreciably.

Figure 15:
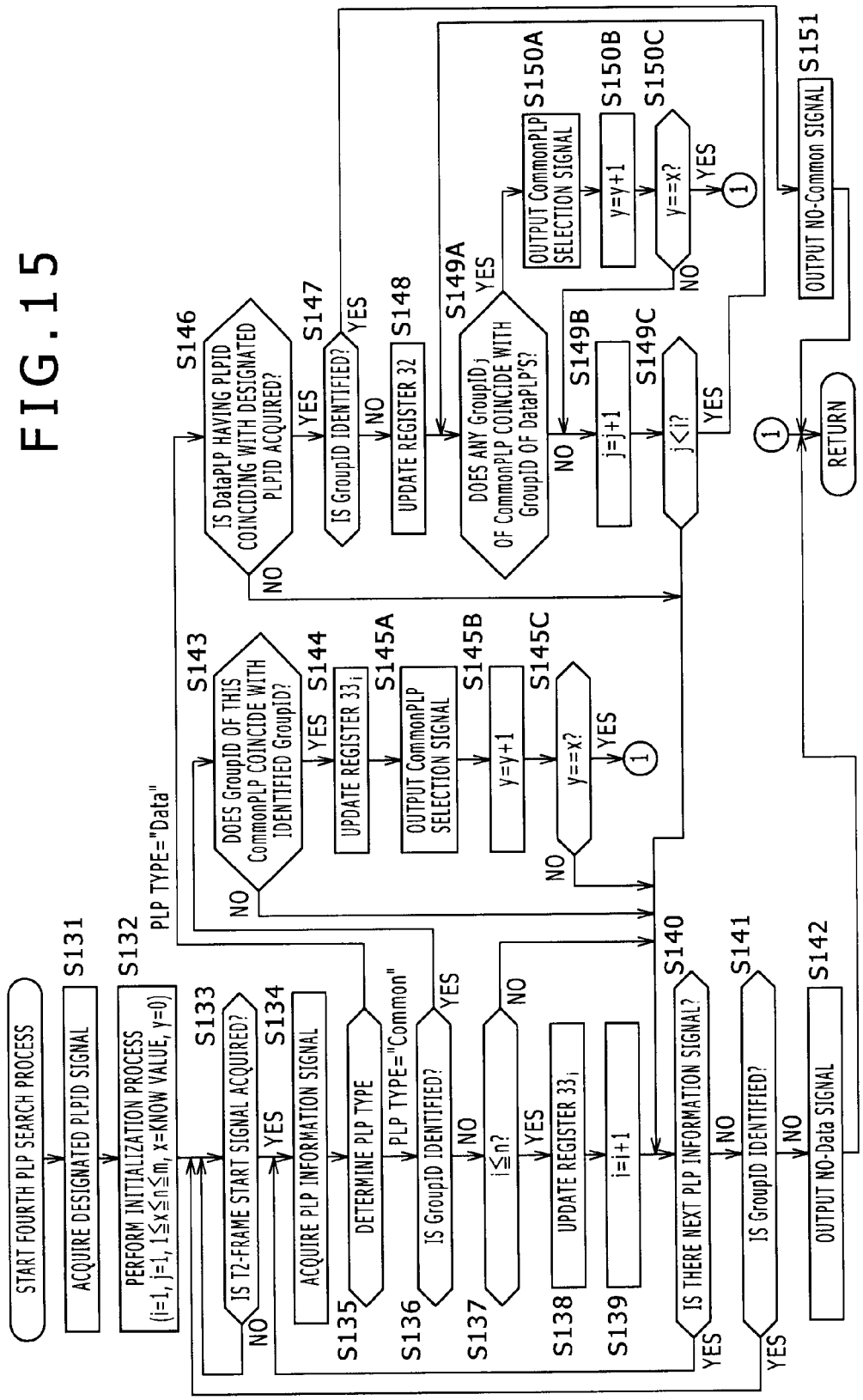
FIG. 15 is a flowchart explanatory of a fourth PLP search process.

The fourth PLP search process is carried out by the above-described control section 16 in FIG. 13. Thus the structure of the control section 16 will not be discussed further. FIG. 15 is a flowchart explanatory of the fourth PLP search process.

In step S131, the control circuit 31 acquires the designated PLPID signal. In step S132, the control circuit 31 performs an initialization process.

In the initialization process of the fourth PLP search process, the initial value i on the counter for registers 33 is set to 1 (i=1); the number n representing the number of registers 33 is established (1≤x≤n≤m); the number x of Common PLP's is set to a known value; and the initial value y on the counter for Common PLP's is set to 0 (y=0).

Subsequent to step S133, steps S133 through S151 in FIG. 15 correspond respectively to steps S51 through S71 in FIG. 11 although some steps are different because there exist a plurality of Common PLP's. More specifically, the differences are that steps S145A through S145C in FIG. 15 correspond to step S65 in FIG. 11, that steps S149A through S149C correspond to step S69 in FIG. 11, and that steps S150A through S150C in FIG. 15 correspond to step S70 in FIG. 11. The ensuing description will be focused on these differences.

That is, if the Data PLP having the PLPID coinciding with the designated PLPID is found acquired ("Yes" in step S146), then the PLP information signal of the Data PLP corresponding to the designated PLPID is written to the register 32, and the GroupID is identified (step S148). In step S149A, the control circuit 31 checks to determine whether any of the GroupID$_j$ (1≤j<i) included in the PLP information signals of the Common PLP's coincides with the GroupID (specific GroupID) included in the PLP information signal of the Data PLP.

If in step S149A the GroupID$_j$ is found to coincide with the specific GroupID, step S150A is reached. In step S150A, the control circuit 31 supplies the selection circuit 41 with a Common PLP selection signal for selecting the output from the register 33$_j$ that holds the PLP information signal containing the GroupID$_j$ coinciding with the specific GroupID. In step S150B, the control circuit 31 increments the value y by 1. In step S1500, the control circuit 31 checks to determine whether the relationship of x==y is satisfied.

If in step S150C the relationship of x==y is found satisfied, that means all Common PLP's relative to the desired Data PLP have been identified. In this case, the search process is brought to an end. If the relationship of x==y is not found satisfied ("No" in step S150C), or if no GroupID$_j$ is found to coincide with the specific GroupID ("Yes" in step S149A), then step S149B is reached. In step S149B, the control circuit 31 increments the value j by 1. In step S149C, the control circuit 31 checks to determine whether the relationship of j<i is satisfied. If in step S149C the relationship of j<i is found satisfied, step S149A is reached again and the subsequent steps are repeated. If in step S149C the relationship of j<i is not found satisfied, step S140 is reached. If in step S140 the next PLP information signal is found to exist, then the subsequent steps are carried out on that PLP information signal as described above.

If the PLP information signal of which the PLP type is "common" is found acquired after the GroupID is identified, then step S143 is reached. In step S143, the control circuit 31 checks to determine whether the GroupID included in the PLP information signal of this Common PLP coincides with the specific GroupID. If in step S143 the GroupID's are found to match, step S144 is reached. In step S144, the control circuit 31 updates the register $33_i$ using the acquired PLP information signal of the Common PLP. In step S145A, the control circuit 31 sends the corresponding Common PLP selection signal to the selection circuit 41. In step S145B, the control circuit 31 increments the value y by 1. In step S145C, the control circuit 31 checks to determine whether the relationship of x==y is satisfied. If in step S145C the relationship of x==y is found satisfied, that means all Common PLP's relative to the desired Data PLP have been identified. This brings the search process to an end. If the relationship of x==y is not found satisfied ("No" in step S145C), then step S140 is reached. If in step S140 the next PLP information signal is found to exist, then the subsequent steps described above are carried out on that PLP information signal.

For the fourth PLP search process, as described above, even where there are provided a predetermined number of Common PLP's relative to the desired Data PLP, the number of registers for holding the PLP information of the Common PLP's is reduced appreciably. If the desired PLP information is identified within the first T2 frame, the PLP search process is finished rapidly within one T2 frame. This allows the decoding process section 13 to perform its decoding process at high speed.

Figure 16:
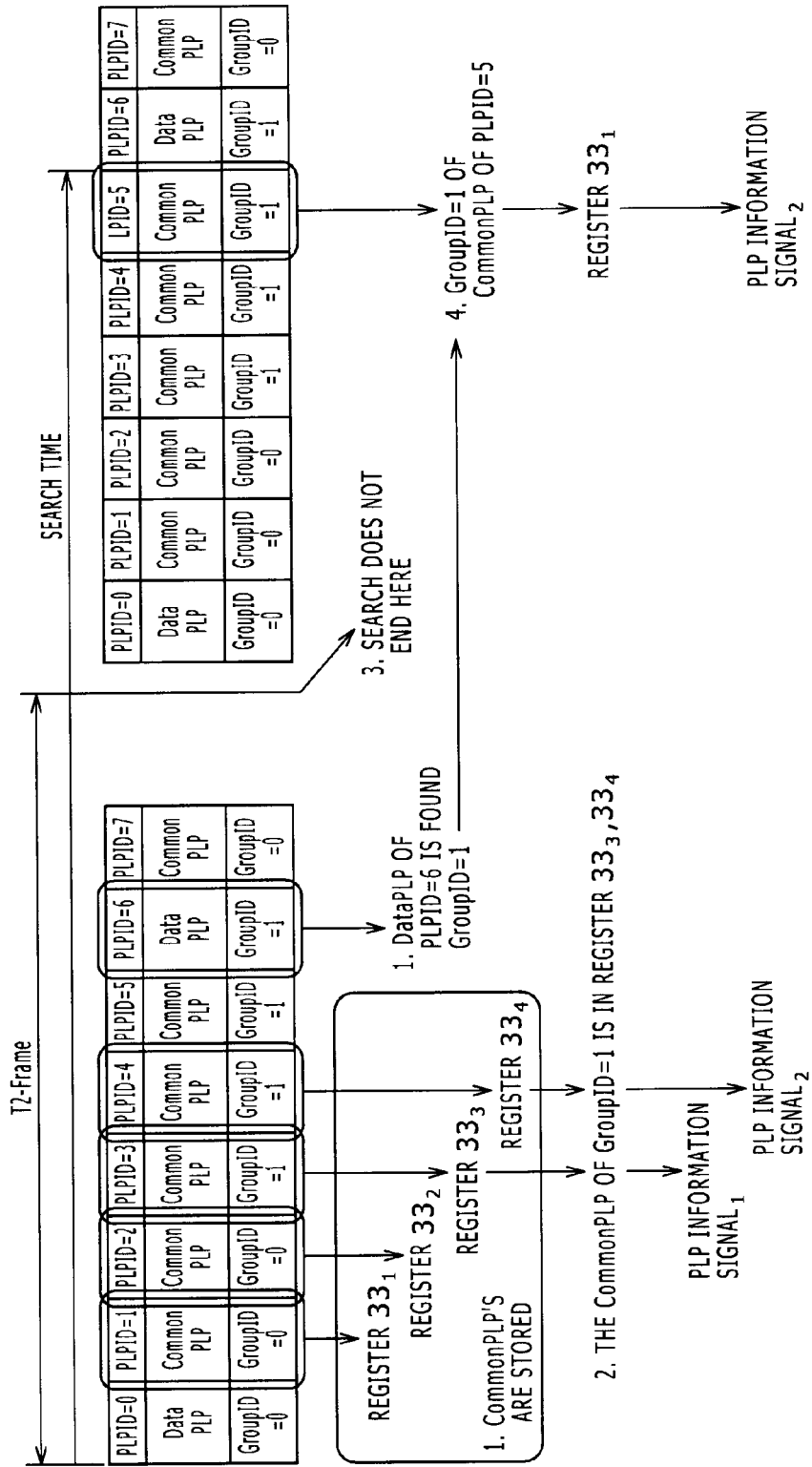
FIG. 16 is a schematic view showing a specific example of the fourth PLP search process.

A more specific example of the fourth PLP search process is explained below by reference to FIG. 16. In the example of FIG. 16, the designated PLPID is assumed to be 6. There are provided four registers $33_1$ through $33_4$ in order to reduce the number of registers (n=4). The number x of Common PLP's relative to a Data PLP is set to be 3 (x=3).

As shown in FIG. 16, a search started from the beginning finds PLPID=1 through PLPID=4 to be "common" in PLP type. The process sets the PLP information of PLPID=1 to the register $33_1$, the PLP information of PLPID=2 to the register $33_2$, the PLP information of PLPID=3 to the register $33_3$, and the PLP information of PLPID=4 to the register $33_4$. Although PLPID=5 is also found to be "common" in PLP type, the PLP information of PLPID=5 is not retained because the four registers $33_1$ through $33_4$ have been used up. The search is continued further for the designated Data PLP.

The seventh Data PLP from the beginning turns out to be PLPID=6, so that the PLP information of PLPID=6 is set to the register 32. A search is made through the GroupID's contained in the PLP information held in the register $33_1$ through $33_4$ for the GroupID coinciding with the specific GroupID=1 contained in the PLP information in the register 32. The search reveals that the PLP information held in each of the registers $33_3$ and $33_4$ has GroupID=1. Thus the PLP information of PLPID=3 and that of PLPID=4 are selected by the selection circuit 41 and output as a PLP information signal 1 and a PLP information signal 2, respectively. Then the PLP search through the first T2 frame is to be terminated. At this point, however, the relationship of y<x (y=2, x=3) remains in effect so that the PLP search process is not stopped here. The process is put on hold until a second T2 frame start signal is given.

Given the second T2 frame start signal, the PLP search process is resumed. The search finds that PLPID=5 in the second T2 frame is "common" in PLP type and has GroupID=1. Thus the PLP information of PLPID=5 is set to the register $33_1$. The PLP information in the register $33_1$ is selected by the selection circuit 41 and later output as a PLP information signal 3. At this point, the value y is incremented by 1 (y=3) and the relationship of y==x is satisfied, which brings the PLP search process to an end.

In the example of FIG. 16, four registers 33 are assumed to be provided (n=4), so that the PLP search process is not finished in the first T2 frame and continues into the second T2 frame. In practice, as discussed above, the value n is determined in consideration of a tradeoff between the need for accelerating the decoding process of the decoding process section 13 on the one hand the affordable number of registers 33 on the other hand. Because as many as x pieces of Common PLP decoding information are to be written to the n registers 33, the relationship of n≤x must always be satisfied.

[Explanation of the Fifth PLP Search Process]

In connection with the third and the fourth PLP search processes, the number x of Common PLP's was shown to be predetermined. However, this is not limitative of the present invention. Alternatively, instead of being fixed beforehand (e.g., x=3), the number x of Common PLP's may be indefinite. What follows is an explanation of the fifth PLP search process for which the number of Common PLP's is assumed to be indefinite.

Figure 17:
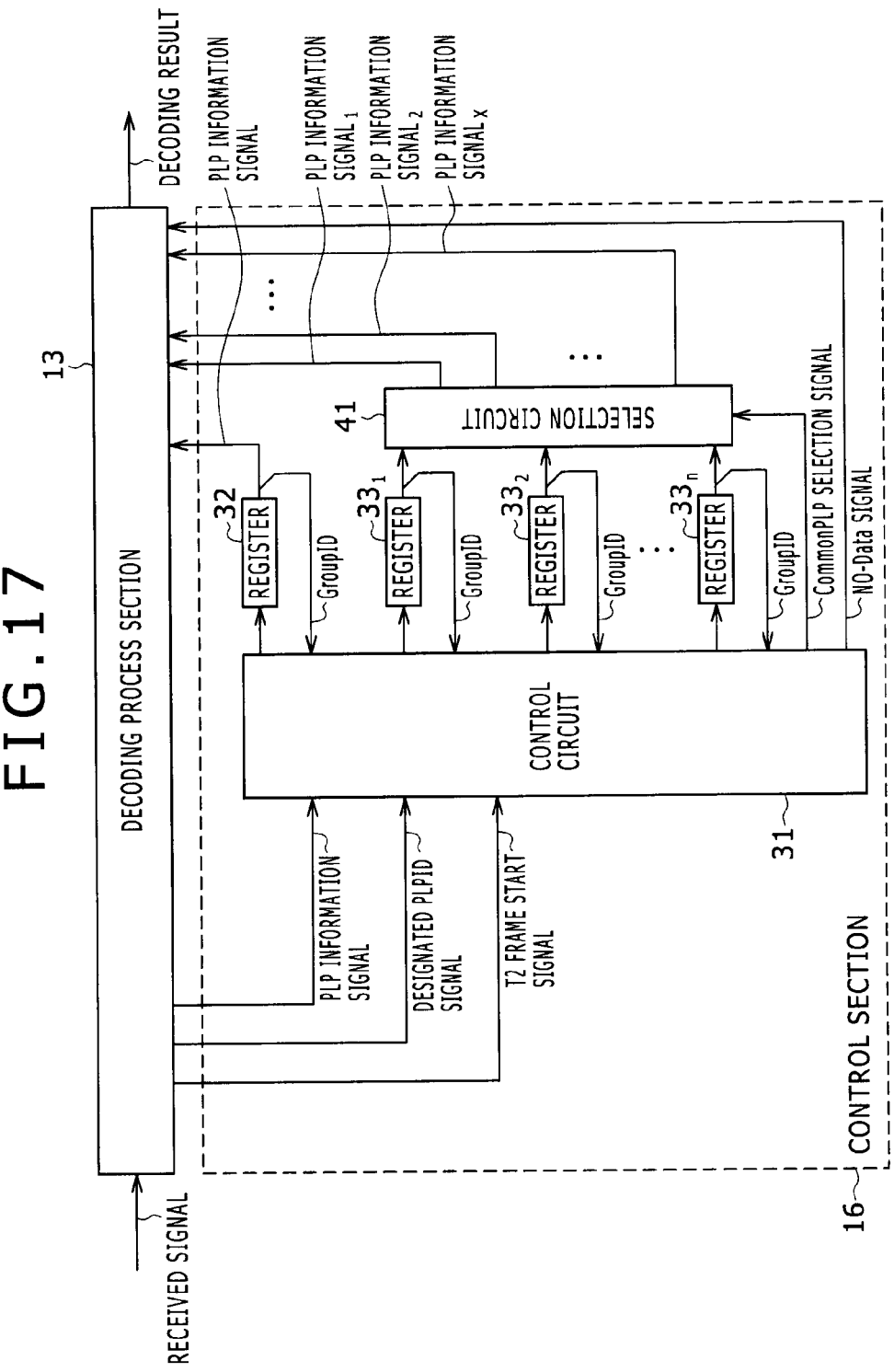
FIG. 17 is a block diagram showing another detailed structure of the control section.

FIG. 17 is a block diagram showing another typical structure of the control section 16. In FIG. 17, the components also found in FIG. 13 are designated by like reference numerals, and their descriptions will be omitted hereunder where redundant.

In FIG. 17, the control circuit 31 does not send the common-lacking signal the decoding process section 13. This is because the number x of Common PLP's is indefinite so that it is unclear whether the number of detected Common PLP's is sufficient or not.

Figure 18:
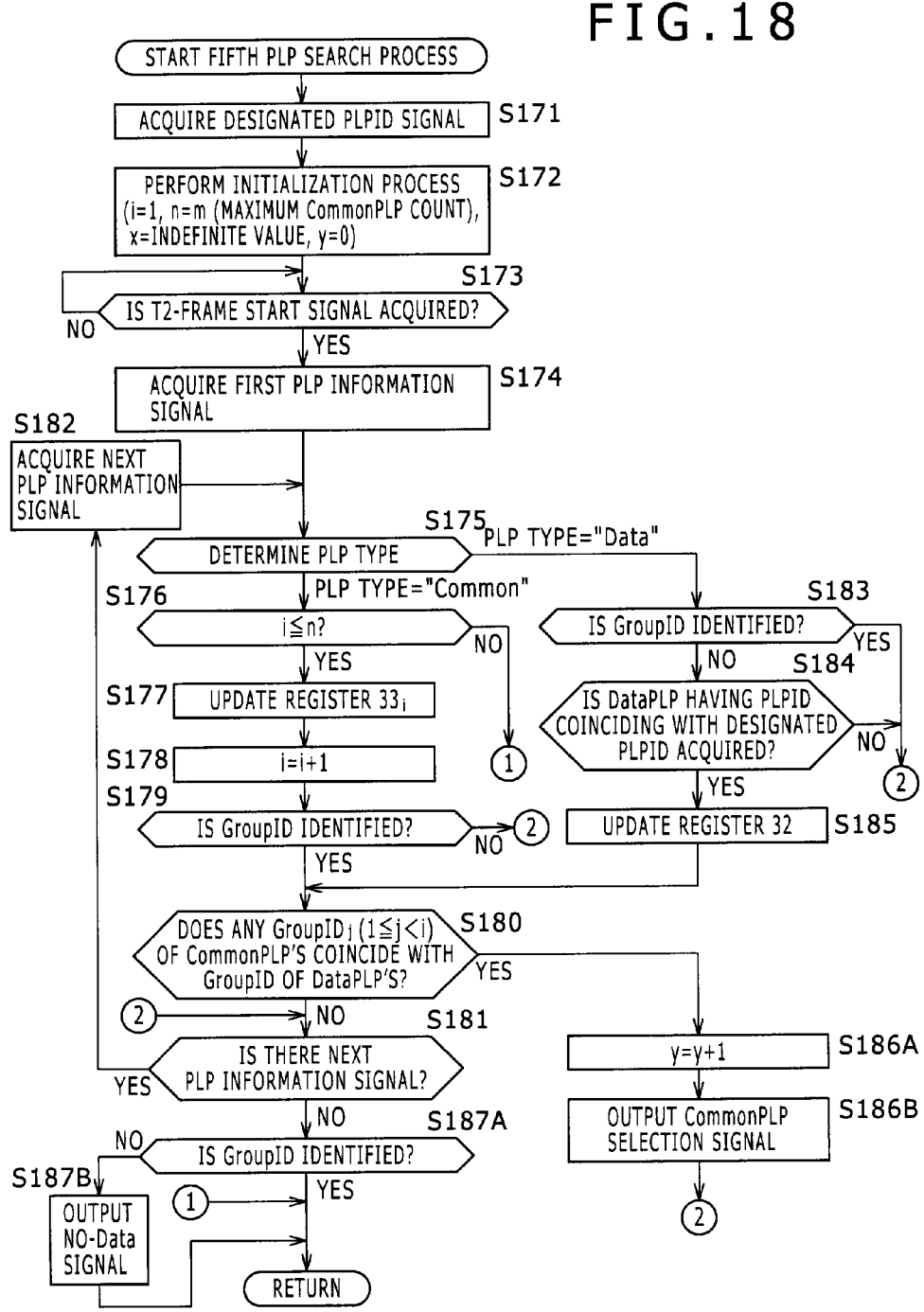
FIG. 18 is a flowchart explanatory of a fifth PLP search process.

The fifth PLP search process is explained below by reference to the flowchart of FIG. 18. In step S171, the control circuit 31 acquires the designated PLPID signal. In step S172, the control circuit 31 performs an initialization process.

In the initialization process of the fifth PLP search process, the initial value i on the counter for registers 33 is set to 1 (i=1); the value n representing the number of registers 33 is established (n=m (maximum Common PLP (information signal) count); the number x of Common PLP's is set to be indefinite; and the initial value y on the counter for Common PLP's is set to 0 (y=0).

Figure 14:
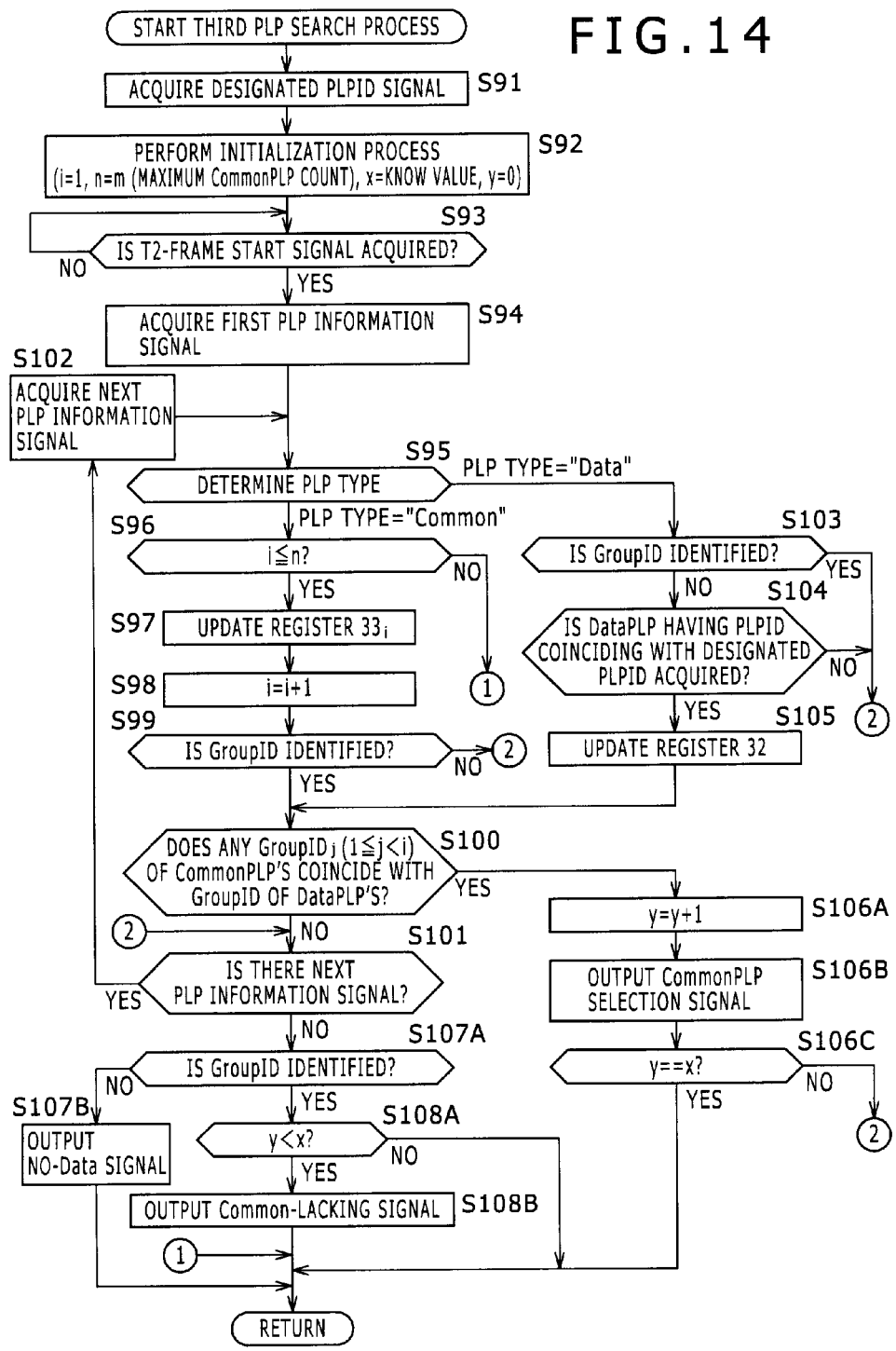
FIG. 14 is a flowchart explanatory of a third PLP search process.

In steps S173 through S185, as in steps S93 through S105 of FIG. 14, the control circuit 31 searches for the Common PLP's appended to the designated Data PLP. In step S180, the control circuit 31 checks to determine whether any of the GroupID$_j$ (1≤j<i) included in the PLP information signals of the Common PLP's held in the registers $33_1$ through $33_j$ coincides with the specific GroupID.

If in step S180 there is found the GroupID$_j$ coinciding with the specific GroupID, step S186A is reached. In step S186A, the control circuit 31 increments the value y by 1. In step S186B, the control circuit 31 supplies the selection circuit 41 with a Common PLP selection signal for selecting the output from the register $33_j$. The signal causes the selection circuit 41 to supply the decoding process section 13 with the output from the register $33_j$ as a PLP information signal y (1≤y≤x).

Control is then passed on to step S181 and the subsequent steps described above are repeated. That is, a check is made to determine whether the GroupID included in the PLP information of which the PLP type is "common" coincides with the specific GroupID. If these GroupID's are found to match, then the selection circuit 41 is fed with a Common PLP selection signal for causing the output of the register $33_j$ holding the matching GroupID to be output as a PLP information signal y. These steps are repeated until the next PLP information signal is exhausted ("No" in step S181).

For the fifth PLP search process, as described above, even if the number of Common PLP's relative to the desired Data PLP is indefinite, the PLP search process is always finished within one T2 frame. This allows the decoding process section 13 to perform its decoding process at high speed using the PLP information acquired rapidly through the search process.

[Configuration Example of the Reception System]

Figure 19:
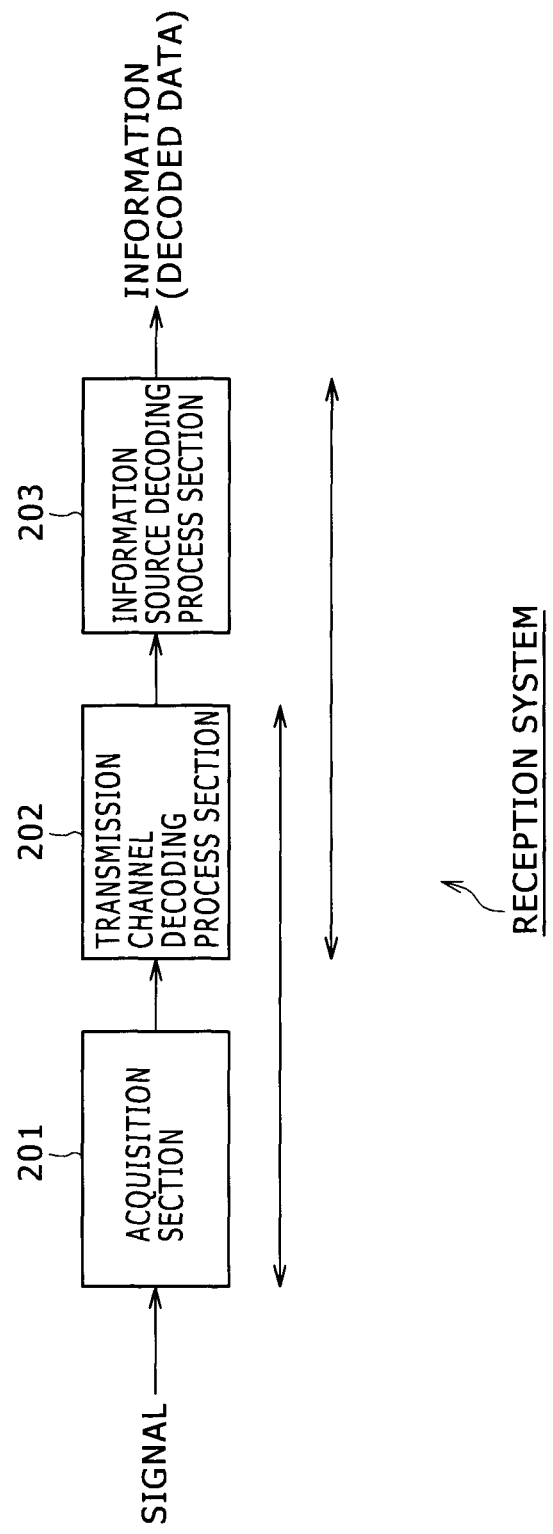
FIG. 19 is a schematic view showing a configuration example of a first embodiment of a reception system according to the present invention.

Typical configurations of a reception system will now be described by reference to FIGS. 19 through 21. FIG. 19 is a schematic view showing a configuration example of the first embodiment of the reception system according to the present invention. In FIG. 19, the reception system is made up of an acquisition section 201, a transmission channel decoding process section 202, and an information source decoding process section 203.

The acquisition section 201 acquires the OFDM signal according to the M-PLP method under DVB-T2 via a transmission channel not shown such as a terrestrial digital broadcast, a satellite digital broadcast, a CATV (cable television) network, the Internet, or some other network. The OFDM signal thus acquired is sent to the transmission channel decoding process section 202.

If the OFDM signal is transmitted illustratively from broadcasting stations over terrestrial waves, satellite waves or CATV networks, then the acquisition section 201 is composed of a tuner or a set-top box (STB) as in the case of the acquisition section 12 in FIG. 5. If the OFDM signal is sent illustratively from web servers in multicast fashion as in the case of IPTV (Internet Protocol Television), then the acquisition section 201 is formed by a network interface such as NIC (network interface card).

Where the OFDM signal is transmitted illustratively from broadcasting stations over terrestrial waves, satellite waves or CATV networks, a single acquisition section 201 receives a plurality of OFDM signals coming from a plurality of transmission apparatuses over a plurality of transmission channels. These OFDM signals are synthesized resultantly into a single OFDM signal when received by the acquisition section 201.

The transmission channel decoding process section 202 performs a transmission channel decoding process including at least PLP decoding on the OFDM signal acquired by the acquisition section 201 over the transmission channel. The signal resulting from the process is forwarded to the information source decoding process section 203.

More specifically, the OFDM signal according to the M-PLP method is formed by a plurality of Data PLP's composed of the packets left behind after extracting from a plurality of transport streams (TS's) those packets common to all TS's, and by Common PLP's constituted by the packets common to the TS's. The transmission channel decoding process section 202 typically performs a PLP (packet sequence) decoding process on that OFDM signal.

The OFDM signal acquired by the acquisition section 201 over the transmission channel is an OFDM signal in a distorted state caused by transmission channel characteristics. Given such an OFDM signal, the transmission channel decoding section 202 illustratively carries out demodulation processes such as transmission channel estimation, channel estimation, and phase estimation.

Furthermore, the transmission channel decoding process may include the process of correcting errors that may have occurred over the transmission channel. Illustratively, such error correction coding may be LDPC coding or Reed-Solomon coding.

The information source decoding process section 203 performs an information source decoding process including at least the process of decompressing the signal having undergone the transmission channel decoding process. The decoding process expands the compressed information back to the original information.

More specifically, the OFDM signal acquired by the acquisition section 201 over the transmission channel may have been compression-coded in order to reduce the amount of data such as images and sounds. In such a case, the information source decoding process section 203 carries out its information source decoding process including the process of decompressing the compressed signal (i.e., decompression process) having undergone the transmission channel decoding process, whereby the compressed information is expanded back to the original information.

If the OFDM signal acquired by the acquisition section 201 over the transmission channel is not found compression-coded, then the information source decoding process section 203 will not perform the process of decompressing the compressed information.

A typical decompression process is MPEG decoding. The transmission channel decoding process may include descrambling in addition to the decompression process.

In the reception system structured as outlined above, the acquisition section 201 acquires over the transmission channel the OFDM signal which is made up of image and sound data having undergone compression coding such as MPEG coding and which further underwent error correction coding according to the M-PLP method. The OFDM signal thus acquired is forwarded to the transmission channel decoding process section 202. At this point, the OFDM signal is acquired in a distorted state caused by transmission channel characteristics.

The transmission channel decoding process section 202 performs its transmission channel decoding process made up of the same processes as those executed by the decoding process section 13 and control section 16 in FIG. 5 on the OFDM signal coming from the acquisition section 201. The signal resulting from the transmission channel decoding process is fed to the information source decoding process section 203.

The information source decoding process section 203 performs its information source decoding process composed of the same process as that carried out by the decoder 14 in FIG. 5 on the signal coming from the transmission channel decoding process section 202. The information source decoding process section 203 outputs the resultant images or sounds.

The reception system of FIG. 19 structured as described above may be applied illustratively to the TV tuner or the like for receiving digital TV broadcasts.

The acquisition section 201, transmission channel decoding process section 202, and information source decoding process section 203 may each be structured as a single independent device (e.g., a piece of hardware such as IC (integrated circuit) or a software module).

The acquisition section 201 may be combined with the transmission channel decoding process section 202 to form a single set of independent equipment. Such a set of independent equipment may also be formed by the combination of the transmission channel decoding section 202 and information source decoding process section 203, or by the combination of the acquisition section 202, transmission channel decoding section 202, and information source decoding process section 203.

FIG. 20 is a schematic view showing a configuration example of the second embodiment of the reception system according to the present invention. In FIG. 20, the components also found in FIG. 19 are designated by like reference numerals, and their descriptions will be omitted hereunder where redundant.

The reception system in FIG. 20 is similar to its counterpart in FIG. 19 in that the system includes the acquisition section 201, transmission channel decoding process section 202, and information source decoding process section 203. The reception system in FIG. 20 differs from its counterpart in FIG. 19 in that an output section 211 is provided anew.

The output section 211 is illustratively a display device for displaying images and/or speakers for outputting sounds. As such, the output section 211 outputs the video and audio data constituted by the signal output from the information source decoding process section 203. Specifically, the output section 211 outputs images or sounds.

The reception system of FIG. 20 structured as outlined above may be applied illustratively to the TV set for receiving digital TV broadcasts, the radio receiver for receiving radio broadcasts, and the like.

If the OFDM signal acquired by the acquisition section 201 is not found compression-coded, then the signal output from the transmission channel decoding process section 202 is sent directly to the output section 211.

FIG. 21 is a schematic view showing a configuration example of the third embodiment of the reception system according to the present invention. In FIG. 21, the components also found in FIG. 19 are designated by like reference numerals, and their descriptions will be omitted hereunder where redundant.

The reception system in FIG. 21 is similar to its counterpart in FIG. 19 in that the system includes the acquisition section 201 and transmission channel decoding process section 202. The reception system in FIG. 21 is different from its counterpart in FIG. 19 in that the information source decoding process section 203 is omitted and that a recording section 221 is provided anew.

The recording section 221 writes (i.e., records) the signal (e.g., TS packets making up MPEG transport streams) output from the transmission channel decoding process section 202 to recording (storage) media such as optical disks, hard disks (magnetic disks), or flash memories.

The reception system of FIG. 21 structured as described above may be applied illustratively to the recorder or the like for recording TV broadcasts.

In FIG. 21, the reception system may be structured to include the information source decoding process section 203. With this structure, the recording section 221 can record decoded images and sounds derived from the signal having undergone the information source decoding process carried out by the information source decoding process section 203.

[Explanation of the Computer to which this Invention is Applied]

The series of the processes described above may be executed either by hardware or by software. Where the processes are to be carried out by software, the programs constituting the software are installed into suitable computers for process execution. Such computers include one with the software installed beforehand in its dedicated hardware, and a general-purpose personal computer or like equipment capable of executing diverse functions based on the programs installed therein.

FIG. 22 is a schematic view showing a composition example of the hardware of a computer that carries out the series of the above-described processes. In the computer, a CPU (central processing unit) 401, a ROM (read only memory) 402, and a RAM (random access memory) 403 are interconnected by a bus 404.

An input/output interface 405 is further connected to the bus 404. The input/output interface 405 is connected with an input device 406, an output device 407, a storage device 408, a communication device 409, and a drive 410.

The input device 406 is illustratively made up of a keyboard, a mouse, and a microphone. The output device 407 is typically composed of a display device and a speaker. The storage device is typically composed of a hard disk, a nonvolatile memory, or the like. The communication device 409 is generally constituted by a network interface. The drive 410 drives removable media 411 such as a magnetic disk, an optical disk, a magneto-optical disk, or a semiconductor memory.

In the computer structured as outlined above, the CPU 401 performs the series of the above-described processes by loading relevant programs from the storage device 408 into the RAM 403 through the input/output interface 405 and bus 404 and by executing the loaded programs.

The programs to be executed by the computer (i.e., by CPU 401) may be recorded on the removable media 411 such as package media when offered to users. The programs may also be offered via wired or wireless transmission media such as local area networks, the Internet, or digital broadcasts.

In the computer, the programs may be installed into the storage device 408 from the removable media 411 by way of the input/output interface 405, the removable media 411 being attached to the drive 410. The programs may also be installed into the storage device 408 after being received by the communication device 409 via wired or wireless media. Alternatively, the programs may be preinstalled in the ROM 402 or storage device 408.

In this specification, the steps describing the programs stored on the recording medium represent not only the processes that are to be carried out in the depicted sequence (i.e., on a time series basis) but also processes that may be performed parallelly or individually and not necessarily chronologically.

In this specification, the term "system" refers to a logical configuration of a plurality of component devices.

It should be understood by those skilled in the art that various modifications, combinations, sub-combinations and alterations may occur depending on design requirements and other factor in so far as they are within the scope of the appended claims or the equivalents thereof.

The present application contains subject matter related to that disclosed in Japanese Priority Patent Application JP 2009-294546 filed in the Japan Patent Office on Dec. 25, 2009, the entire content of which is hereby incorporated by reference.

What is claimed is:

1. A reception apparatus comprising:
   circuitry configured to:
   receive an orthogonal frequency division multiplexing (OFDM) signal formed by modulating common packet sequences and data packet sequences, said common packet sequences being made up of packets common to a plurality of streams, said data packet sequences being constituted by packets unique to each of said plurality of streams;
   acquire decoding information for decoding original streams from said common packet sequences and said data packet sequences obtained by demodulating the received OFDM signal; and
   search for a common packet sequence needed to decode the original streams from a designated data packet sequence on the basis of the acquired decoding information; and
   a memory configured to store the decoding information about the acquired common packet sequences until the decoding information about said designated data packet sequence is acquired, wherein
   when the decoding information about said designated data packet sequence is acquired, said circuitry searches the stored decoding information about said common packet sequences for the decoding information identified by the decoding information about the acquired data packet sequences.

2. The reception apparatus according to claim 1, wherein, if the decoding information cannot be identified from the stored decoding information about said common packet sequences, then said circuitry is configured to search for the decoding information identified by the decoding information about the acquired data packet sequences out of that decoding information about said common packet sequences which is acquired following the acquisition of the decoding information about said designated data packet sequence.

3. The reception apparatus according to claim 2, wherein said memory includes as many as n registers, the number n satisfying a relationship of n=m where m represents a maximum number of units of the decoding information about said common packet sequences, and
   if the decoding information about said common packet sequences cannot be identified from within a first frame targeted for the search, then said circuitry determines that said common packet sequences do not exist.

4. The reception apparatus according to claim 3, wherein there exist a predetermined number of units of the decoding information about said common packet sequences which are identified by the decoding information about said designated data packet sequence, and
   said circuitry searches for said predetermined number of units of the decoding information about said common packet sequences which are identified by the decoding information about said designated data packet sequence.

5. The reception apparatus according to claim 2, wherein said memory includes as many as n registers, the number n satisfying a relationship of 1≤n≤m where m represents a maximum number of units of the decoding information about said common packet sequences, and
   if the decoding information about said common packet sequences cannot be identified from within a first frame targeted for the search, then said circuitry searches through a second frame next to said first frame.

6. The reception apparatus according to claim 5, wherein there exist a predetermined number x of units of the decoding information about said common packet sequences which are identified by the decoding information about said designated data packet sequence, the number x satisfying a relationship of 1≤x≤n≤m, and
   said circuitry searches for said predetermined number of units of the decoding information about said common packet sequences which are identified by the decoding information about said designated data packet sequence.

7. The reception apparatus according to claim 2, wherein there exist an indefinite number of units of the decoding information about said common packet sequences which are identified by the decoding information about said designated data packet sequence, and
   said circuitry searches for said indefinite number of units of the decoding information about said common packet sequences which are identified by the decoding information about said designated data packet sequence.

8. The reception apparatus according to claim 1, wherein said decoding information includes at least a first and a second identifier, said first identifier identifying each packet sequence, said second identifier distinguishing the corresponding common packet sequence from said data packet sequences, and
   said circuitry identifies the decoding information about the data packet sequence having the designated first identifier, before identifying the decoding information about the common packet sequence having said second identifier included in the decoding information about said designated data packet sequence.

9. The reception apparatus according to claim 1, wherein the circuitry is further configured to decode the original streams from said common packet sequences and said data packet sequences based on a result of the search made by said circuitry.

10. The reception apparatus according to claim 1, wherein said common packet sequences and said data packet sequences are constituted, respectively, by common physical pipe layers (Common PLPs) and by data physical pipe layers (Data PLPs) generated from a plurality of original streams according to a multiple physical layer pipe (M-PLP) method under DVB-T2.

11. A reception method for causing a reception apparatus to execute a procedure comprising:
    receiving an orthogonal frequency division multiplexing (OFDM) signal formed by modulating common packet sequences and data packet sequences, said common packet sequences being made up of packets common to a plurality of streams, said data packet sequences being constituted by packets unique to each of said plurality of streams;
    acquiring decoding information for decoding original streams from said common packet sequences and said data packet sequences obtained by demodulating the received OFDM signal;
    searching for a common packet sequence needed to decode the original streams from a designated data packet sequence on the basis of the acquired decoding information;
    storing the decoding information about the acquired common packet sequences until the decoding information about said designated data packet sequence is acquired; and searching, when the decoding information about said designated data packet sequence is acquired, the stored decoding information about said common packet sequences for the decoding information identified by the decoding information about the acquired data packet sequences.

12. A non-transitory computer-readable medium comprising a program for causing a computer to execute a procedure comprising:
receiving an orthogonal frequency division multiplexing signal known as an OFDM signal formed by modulating common packet sequences and data packet sequences, said common packet sequences being made up of packets common to a plurality of streams, said data packet sequences being constituted by packets unique to each of said plurality of streams;
acquiring decoding information for decoding original streams from said common packet sequences and said data packet sequences obtained by demodulating the received OFDM signal;
searching for a common packet sequence needed to decode the original streams from a designated data packet sequence on the basis of the acquired decoding information;
storing the decoding information about the acquired common packet sequences until the decoding information about said designated data packet sequence is acquired; and
searching, when the decoding information about said designated data packet sequence is acquired, the stored decoding information about said common packet sequences for the decoding information identified by the decoding information about the acquired data packet sequences.

13. A reception system comprising:
communication interface circuitry configured to acquire via a transmission channel an orthogonal frequency division multiplexing (OFDM) signal formed by modulating common packet sequences and data packet sequences, said common packet sequences being made up of packets common to a plurality of streams, said data packet sequences being constituted by packets unique to each of said plurality of streams;
processing circuitry configured to perform a transmission channel decoding process including at least a packet sequence decoding process on said OFDM signal acquired via said transmission channel;
wherein said processing circuitry is configured to:
 acquire decoding information for decoding original streams from said common packet sequences and said data packet sequences obtained by demodulating said OFDM signal received via said transmission channel, and
 search for a common packet sequence needed to decode the original streams from a designated data packet sequence on the basis of the acquired decoding information; and
a memory configured to store the decoding information about the acquired common packet sequences until the decoding information about said designated data packet sequence is acquired, wherein
when the decoding information about said designated data packet sequence is acquired, said processing circuitry searches the stored decoding information about said common packet sequences for the decoding information identified by the decoding information about the acquired data packet sequences.

14. A reception system comprising:
transmission channel decoding circuitry configured to perform a transmission channel decoding process including at least a packet sequence decoding process on an orthogonal frequency division multiplexing (OFDM) signal acquired via a transmission channel and formed by modulating common packet sequences and data packet sequences, said common packet sequences being made up of packets common to a plurality of streams, said data packet sequences being constituted by packets unique to each of said plurality of streams;
information source decoding circuitry configured to perform an information source decoding process including at least a data decompression process on the OFDM signal having undergone said transmission channel decoding process;
wherein said transmission channel decoding circuitry is configured to:
 acquire decoding information for decoding original streams from said common packet sequences and said data packet sequences obtained by demodulating said OFDM signal acquired via said transmission channel, and
 search for a common packet sequence needed to decode the original streams from a designated data packet sequence on the basis of the acquired decoding information; and
a memory configured to store the decoding information about the acquired common packet sequences until the decoding information about said designated data packet sequence is acquired, wherein
when the decoding information about said designated data packet sequence is acquired, said transmission channel decoding circuitry searches the stored decoding information about said common packet sequences for the decoding information identified by the decoding information about the acquired data packet sequences.

15. A reception system comprising:
transmission channel decoding circuitry configured to perform a transmission channel decoding process including at least a packet sequence decoding process on an orthogonal frequency division multiplexing (OFDM) signal acquired via a transmission channel and formed by modulating common packet sequences and data packet sequences, said common packet sequences being made up of packets common to a plurality of streams, said data packet sequences being constituted by packets unique to each of said plurality of streams;
output circuitry configured to output an image or a sound based on the OFDM signal having undergone said transmission channel decoding process;
wherein said transmission channel decoding circuitry is configured to
 acquire decoding information for decoding original streams from said common packet sequences and said data packet sequences obtained by demodulating said OFDM signal acquired via said transmission channel, and
 search for a common packet sequence needed to decode the original streams from a designated data packet sequence on the basis of the acquired decoding information; and
a memory configured to store the decoding information about the acquired common packet sequences until the decoding information about said designated data packet sequence is acquired, wherein when the decoding information about said designated data packet sequence is acquired, said transmission channel decoding circuitry searches the stored decoding information about said common packet sequences for the decoding information identified by the decoding information about the acquired data packet sequences.

16. A reception system comprising:

transmission channel decoding circuitry configured to perform a transmission channel decoding process including at least a packet sequence decoding process on an orthogonal frequency division multiplexing (OFDM) signal acquired via a transmission channel and formed by modulating common packet sequences and data packet sequences, said common packet sequences being made up of packets common to a plurality of streams, said data packet sequences being constituted by packets unique to each of said plurality of streams; and recording circuitry configured to record the OFDM signal having undergone said transmission channel decoding process;

wherein said transmission channel decoding circuitry is configured to acquire decoding information for decoding original streams from said common packet sequences and said data packet sequences obtained by demodulating said OFDM signal acquired via said transmission channel, and search for a common packet sequence needed to decode the original streams from a designated data packet sequence on the basis of the acquired decoding information; and a memory configured to store the decoding information about the acquired common packet sequences until the decoding information about said designated data packet sequence is acquired, wherein when the decoding information about said designated data packet sequence is acquired, said transmission channel decoding circuitry searches the stored decoding information about said common packet sequences for the decoding information identified by the decoding information about the acquired data packet sequences.

* * * * *